United States Patent
Moritz et al.

(10) Patent No.: US 11,110,688 B2
(45) Date of Patent: Sep. 7, 2021

(54) ANTI-BLUSH AND CHEMICAL RESISTANT POLYESTER FILM

(71) Applicant: TORAY PLASTICS (AMERICA), INC., North Kingstown, RI (US)

(72) Inventors: Jan Moritz, Bristol, RI (US); Robert Ervolino, Foster, RI (US)

(73) Assignee: TORAY PLASTICS (AMERICA), INC., North Kingstown, RI (US)

( * ) Notice: Subject to any disclaimer, the term of this patent is extended or adjusted under 35 U.S.C. 154(b) by 224 days.

(21) Appl. No.: 16/028,259

(22) Filed: Jul. 5, 2018

(65) Prior Publication Data
US 2020/0009835 A1 Jan. 9, 2020

(51) Int. Cl.
| | | |
|---|---|---|
| B32B 15/09 | (2006.01) |
| B32B 27/36 | (2006.01) |
| C08K 5/00 | (2006.01) |
| C08K 5/5333 | (2006.01) |
| C08L 67/02 | (2006.01) |
| B32B 15/18 | (2006.01) |
| B32B 27/20 | (2006.01) |
| C08K 5/5317 | (2006.01) |
| C08K 5/53 | (2006.01) |
| C08K 5/5357 | (2006.01) |
| C08L 67/03 | (2006.01) |

(52) U.S. Cl.
CPC .............. *B32B 15/09* (2013.01); *B32B 27/36* (2013.01); *C08K 5/0041* (2013.01); *C08K 5/5333* (2013.01); *C08L 67/02* (2013.01); *B32B 15/18* (2013.01); *B32B 27/20* (2013.01); *B32B 2307/30* (2013.01); *B32B 2307/40* (2013.01); *B32B 2307/402* (2013.01); *B32B 2307/4026* (2013.01); *B32B 2307/412* (2013.01); *B32B 2311/30* (2013.01); *B32B 2367/00* (2013.01); *B32B 2439/66* (2013.01); *C08K 5/53* (2013.01); *C08K 5/5317* (2013.01); *C08K 5/5357* (2013.01); *C08L 67/03* (2013.01); *C08L 2203/16* (2013.01); *Y10T 428/31681* (2015.04); *Y10T 428/31786* (2015.04)

(58) Field of Classification Search
None
See application file for complete search history.

(56) References Cited

U.S. PATENT DOCUMENTS

| | | | | | |
|---|---|---|---|---|---|
| 3,515,776 | A | * | 6/1970 | Baranauckas | C07F 9/40 558/74 |
| 4,276,234 | A | * | 6/1981 | Honig | C07F 9/4084 558/118 |
| 5,646,208 | A | * | 7/1997 | Cattron | C08L 67/02 524/128 |
| 5,780,158 | A | * | 7/1998 | Asai | B32B 15/08 428/412 |
| 5,902,539 | A | * | 5/1999 | Schmidt | C08L 67/02 264/513 |
| 5,922,828 | A | * | 7/1999 | Schiraldi | C08G 63/82 528/279 |
| 10,689,486 | B2 | * | 6/2020 | Kato | C08G 63/672 |
| 2002/0102419 | A1 | * | 8/2002 | Kawahara | B32B 27/36 428/458 |
| 2005/0118442 | A1 | * | 6/2005 | Itoh | B32B 27/36 428/480 |
| 2005/0191483 | A1 | * | 9/2005 | Yoshida | B32B 15/08 428/332 |
| 2006/0116526 | A1 | * | 6/2006 | Tanabe | C07F 9/657181 558/77 |
| 2006/0226395 | A1 | * | 10/2006 | Krohnke | C08K 5/12 252/403 |
| 2007/0009750 | A1 | * | 1/2007 | Ito | C08J 5/18 428/458 |
| 2008/0194741 | A1 | * | 8/2008 | Engelmann | C08L 101/005 524/100 |
| 2016/0145462 | A1 | * | 5/2016 | Kawamura | C08L 67/02 428/336 |
| 2019/0218237 | A1 | * | 7/2019 | Yamanaka | C07F 9/65746 |
| 2020/0190315 | A1 | * | 6/2020 | Moritz | B32B 15/08 |

FOREIGN PATENT DOCUMENTS

| | | | |
|---|---|---|---|
| JP | H-09277473 A | | 10/1997 |
| JP | H-10109391 A | | 4/1998 |
| JP | 3293297 B2 | | 6/2002 |
| JP | 2003-267984 A | * | 9/2003 |
| JP | 2004-268574 A | * | 9/2004 |
| JP | 2016-121276 A | | 7/2016 |
| JP | WO 2018-021002 A | * | 2/2018 |
| JP | 2018-109122 A | * | 7/2018 |

OTHER PUBLICATIONS

JP 2004-268574 A (Matsui et al) (published Sep. 30, 2004) full machine translation. (Year: 2004).*
International Search Report and Written Opinion dated Oct. 18, 2019 for PCT application No. PCT/US2019/040706.

* cited by examiner

*Primary Examiner* — Vivian Chen
(74) *Attorney, Agent, or Firm* — Dave Law Group LLC; Raj S. Dave

(57) ABSTRACT

Embodiments herein relate to a polymer film comprising an anti-blushing composition in a blend comprising polyethylene terephthalate (PET) and polybutylene terephthalate (PBT); wherein the blend has an intrinsic viscosity above 0.75 and contains at least 50 wt. % of PBT; wherein the anti-blushing composition comprises a phosphorus containing compound but excludes certain phosphorus compounds; and wherein the anti-blushing composition is configured to prevent blushing in the polymer film laminated directly to a metal sheet and exposed to steam at a temperature of 260° F. for 90 minutes.

17 Claims, No Drawings

ANTI-BLUSH AND CHEMICAL RESISTANT POLYESTER FILM

CROSS REFERENCE TO RELATED APPLICATIONS

This application is related to U.S. patent application Ser. No. 15/879,167, filed Jan. 24, 2018, entitled "Method of packaging product in container with blush and chemical resistant polyester film,", which is a divisional of U.S. patent application Ser. No. 14/555,542, filed Nov. 26, 2014, entitled "Blush and chemical resistant polyester film," now U.S. Pat. No. 9,956,747, issued May 1, 2018, which claims priority from U.S. Provisional Patent Application No. 61/989,605, filed May 7, 2014. The above mentioned cross referenced and related applications are incorporated herein by reference in their entirety.

FIELD OF THE INVENTION

An embodiment herein relates to films made from blends of polyethylene terephthalate (PET) and polybutylene terephthalate (PBT) to be used in conjunction with metal cans so that the films can resist discoloration resulting from exposure to high temperature, steam and hot water during cooking and high temperature sterilization of the food contents stored in the metal cans and the films provide protective barriers or interface layers to maintain a safe and stable environment during food preparation, sterilization and storage.

BACKGROUND OF THE INVENTION

Metal containers are used for storage of many different materials in industrial and retail consumer product containment applications. Well known examples of consumer metal storage container utilities include food cans, beverage cans, aerosol spray product cans and the like. Polymer films such as polyester films of various compositions are commonly laminated onto the can metal surface to provide a protective barrier against corrosive environmental conditions. These barrier films are typically laminated onto both sides of the metal so that the inner and outer side metal surfaces of the container are protected from degradation by the internal contained material and the external ambient environment, respectively. In the case of food containers, after containers are filled, they are exposed to a retort process that typically involves the use of heated aqueous media or live steam to cook the food contents inside the metal containers and to sterilize the can and pasteurize the food. It is thus very desirable that the plastic and metal laminate structure of the container be able to withstand heated aqueous media or direct steam contact during such retort process conditions and have sufficient resistance to chemicals and chemically aggressive foods that may be stored in containers made from metal and polymer film laminates.

Retort processing of the containers can adversely affect the quality or the properties of the of the polymer in the metal and polymer laminates used to make the containers. An area of particular interest is a visually observable defect on the outer side of metal containers that manifests as discolored or cloudy spots or areas. In the canning industry this defect is known as "blushing". In the case of plastic film laminated on metal for canned goods, blushing can be attributed to accelerated hydrolysis of the film surface on the outer side of the container promoted by exposure to the steam during the retort process.

Another area of interest is the chemical resistance of the polymeric film laminated to the inner side of the container. This film can degrade because of contact during the long-term storage of harsh chemicals and highly aggressive foods within the containers. Aggressive foods and chemicals can be corrosive to the container metal due to their proximity to ends of the pH scale, especially acidic materials having pH below about 3, and basic materials having pH above about 11. Aggressive foods may be acidic in nature and harsh chemicals may be basic in nature. Some examples of aggressive foods are beets, sauerkraut, and tomato products. Aggressive chemicals such as tub & tile cleaners may have a pH greater than 12.

Much attention has been devoted to the art of blush prevention during the retort process of metal and plastic film laminates on the outer side or external surface of the can. A preferred film composition is a blend of polyethylene terephthalate ("PET"). One of the most common methods cited to improve blush resistance uses polybutylene terephthalate ("PBT") blended with PET in at least the outermost surface of the film. However, it has been discovered that films containing even high levels of PBT blends in the outer layer or layers do not eliminate or satisfactorily prevent the formation of blush especially for retort process using higher temperatures or for retort process with longer residence exposure at somewhat lower temperatures. Thus, there is a need in the canning industry for a polymeric lamination film that exhibits improved blushing resistance and excellent resistance to harsh chemicals and aggressive foods being stored in these containers. A need exists for polyester films, to be used as protective barriers on the outer side of a metal cans, that will withstand the rigorous conditions experienced during retort processing without blushing. In addition, it remains desirable to have polyester films to provide a protective barrier on the inside of a metal can that is able to withstand assault by aggressive foods and harsh chemicals during long term storage.

SUMMARY OF THE INVENTION

Embodiments herein relate to a polymer film comprising an anti-blushing composition in a blend comprising polyethylene terephthalate (PET) and polybutylene terephthalate (PBT). In order to provide satisfactory level of blushing reduction, the present discloses a composition comprising a blend of PET and PBT and blushing-retardant or blushing controlling component that can withstand the retort conditions and the composition demonstrated minimal blushing or no blushing.

The blushing controlling component or blushing-retardant comprises phosphate or a phosphonate or combinations thereof. The blushing controlling component or blushing-retardant further comprises phosphonate, di-phosphonate, pentaerythritol di phosphonate. The blushing controlling component or blushing-retardant further comprises phosphate, di-phosphate, pentaerythritol di phosphate. The blushing controlling component or blushing-retardant further comprises phosphonate, di-phosphonate, pentaerythritol di-phosphonate, phosphate, di-phosphate, pentaerythritol di-phosphate or combinations thereof.

The polymer in the polymer and metal laminate structure for safe and stable environment during food preparation, sterilization and storage is a blend of at least two polyesters. While the lower melting point polyester, PBT, undergoes no change or least changes in its melting point during the formation of the blend, the higher melting point polyester, PET, owing to incorporation of the blushing-retardant or blushing controlling component experiences least drop in its melting point. The resultant polyester blend will resist corrosion, discoloration, oxidation, hydrolysis and degradation during the retort process that can lead to the formation of cracks or gaps or holes associated with blushing.

The higher melting point polyester, PET, maintaining its higher melting point or experiencing lower drops in its melting point compared to its value prior to blending or a combination of the higher melting point PET maintaining its higher melting point and the same time, the lower melting point polyester, PBT, undergoing no change or least changes in its melting point ensures higher crystallinity of the higher melting point polyester, PET, and lowers its potential for co-polyester copolymer formation. Retaining the higher melting point for the PET in the polyester blend is one way to ensure that the polyester or the polyester blend is more semi-crystalline in nature. Thus, maintaining the higher melting point of PET will help to withstand disruptive deformational and environmental forces necessary to resist the formation and propagation of cracks or gaps or holes or discoloration associated with blushing in the polyester or polyester blend that can arise from hydrolysis or from hydrolysis and degradation of polyesters or polyester blends.

Other embodiments relate to a metal laminated sheet comprising a metal sheet and the polymer film and variations thereof described above.

Preferably, the metal sheet comprises an electrolytic chromium coated steel sheet, an electro tin plated steel sheet, an aluminum sheet or combinations thereof.

Yet other embodiments relate to a metal can or a lid of a metal can comprising the metal laminated sheet and variations thereof described above.

DETAILED DESCRIPTION

While this specification concludes with claims particularly pointing out and distinctly claiming that, which is regarded as the invention, it is anticipated that the invention can be more readily understood through reading the following detailed description of the invention and study of the included examples.

The polymeric films can be laminated on either side or both sides of the metal substrate. In context of laminated metal substrate for containers, the side of the substrate or laminated composite structure facing the contents interior to the container is referred to as the inner side of the substrate or laminated composite structure as the case may be. Similarly, the side of the substrate or laminated composite structure on the exterior of the container is identified as the outer side.

An objective of an embodiment herein is to provide a polymer film coated metal composite suitable for fabrication of food storage cans and chemical storage cans, such as are used to package canned foods and chemical goods for individual consumers, for example, household cleaners. To sterilize food-containing cans, the container material is subjected to direct contact with steam. Exposure to steam can cause undesirable discoloration on the outer side surface of the can that is known in the industry as "blushing". After filling and sealing, the inner side of metal food or chemical storage cans are vulnerable to developing undesirable discoloration and/or delamination of the polymer film from the metal. This inner degradation, occasionally referred to herein as "age degradation", results from extended contact of the wall of the can with contained aggressive foodstuff or harsh chemicals during long term storage.

PET is a preferred polymeric composition for this utility, however, PET is subject to blushing and age degradation. Research has shown that blushing of PET is likely the result of accelerated surface hydrolysis. To protect the film from such accelerated surface hydrolysis it has been found to be important to limit the number of total end groups in the surface layer of polymer and to additionally limit the number of carboxyl end groups.

As used in relation to an embodiment herein, the term "retort process" means a procedure of contacting a surface with live steam for a period of time. "Live steam" means that steam directly contacts the surface of the container. The steam is usually superheated, i.e., above the boiling point of water. In context of an embodiment herein, the surface usually is a wall of a metal container. A nominal retort process calls for exposure to steam at temperature of about 251° F. for 90 minutes. The temperature and duration of exposure of the retort process can vary inversely to provide an approximately equivalent sterilization and food pasteurization effectiveness. For example, the temperature might be higher for a shorter duration or lower for a longer duration.

The metal substrates suitable for use in the embodiments herein are electrolytic chromium coated steel plate (occasionally referred to as "tin free substrate" or "TFS"), electro tin plated steel, aluminum, and the like. The PET film of the inner and outer side of the container can have the same or different physical properties depending on the end use application for the composite. For example, in a canned food utility after packing with food, the container is subjected to a retort process for sterilizing the food contents. Later, during service life the outer side laminated film will be exposed to ambient atmospheric environmental conditions. In contrast, the inner laminated film in addition to the retort process will be subjected to extended time contact with contents that may exhibit potentially adverse interaction with the composite. Thus, different inner and outer side polymer films can be utilized where the conditions of exposure are different.

Embodiments herein relate to a composition for the polymer film that forms one component of the polymer and metal laminate structure used as the container for food products. The PET and PBT blend film composition comprises a blush controlling component or a blushing-retardant to prevent blushing or discoloration or formation of cloudy spots in the PET and PBT polymer film that can form during the retort high temperature cooking and sterilization of the food sealed in these cans. The PET and PBT blend film composition also to prevents chemical or structural changes to the metal such as corrosion, discoloration and degradation during the storage period An embodiment herein discloses the process to make the composition for the polymer film comprising blush controlling component or a blushing-retardant and a blend of PET and PBT to prevent blushing of the polymer film during the retort process. An embodiment herein discloses the lamination process between the PET/PBT film comprising and metal sheets.

Metal containers are widely used as storage for multiple consumer product application areas covering, food, beverage, cosmetics, personal care, medicines, construction. The metallic food cans or beverage cans primarily act as containers for storing the food articles without getting contaminated or losing its nutritional value.

The sealed food cans need to prevent any materials from potentially leaching out of the can walls into the food or into the beverage and unfavorably altering them compositionally. On some occasions, aggressive foods can be corrosive to metal container especially for acidic materials having pH below about 3, and basic materials having pH above about 11. The list of aggressive foods includes but not limited to beets, sauerkraut, and tomato products. Bare metal food cans and beverage cans, such as those made from metals, are prone to compositional changes such as corrosion both from the chemical nature of the food or from exposure to ambient environmental conditions during the storage shelf-life of the food or beverage items. The products of these changes can contaminate the food and beverages with undesired metals compounds from corrosion of the metal cans or reactions and interactions of the metals with the food or the environment.

The sealed cans, especially those for food products, also need to be made from material which when exposed to high temperature during cooking and sterilization of the food inside the can will not undergo chemical or structural changes such as corrosion, discoloration, oxidation hydrolysis and degradation. Similarly, the sealed food cans need to be made from material which when it contacts steam or hot aqueous fluids during cooking and high temperature sterilization will not undergo chemical or structural changes such as corrosion, discoloration, oxidation, hydrolysis and degradation.

After the food containers or cans are filled with pre-cooked food or ingredients, they are exposed to a retort process that involves heating of the cans to at least partially cook or preferably fully cook the food or contents inside the metal containers or the metal cans. The retort process also aims to sterilize the cooked food products brought about by destruction of all contaminating bacteria including their spores. The heat treatment process of such products must be intense or aggressive not only to inactivate but also to kill the bacterial microorganisms. The retort process involves directly contacting the outer surface of the food containers or the walls of metal container or cans with live steam for a pre-determined amount of time depending on the desired time to cook and obtain a specific degree of sterilization, preferably full sterilization. The term live steam usually means that the steam is superheated or above the normal atmospheric boiling point of water of 100° C.

The food products, that are at least partially cooked or preferably fully cooked and undergo complete thermal sterilization by application of heat during the retort process, contain one or more types of food from the list including but not limited to cooked hams, cooked pork, cooked sausages, cooked fish, cooked vegetables, beef in gravy, beef with vegetables, beef with rice, chicken in gravy, chicken with vegetables, chicken with rice, fish with gravy, fish with vegetables, fish with rice, vegetables with gravy, vegetables with rice and mixtures thereof.

Unlike pasteurized cooked food products where the survival of heat resistant microorganisms is accepted, the aim of sterilization is the complete destruction of all contaminating bacteria including their spores. If spores are not completely inactivated in the canned foods, microorganisms will grow in the intervening time period after the completion of the thermal treatment and during the time when the food products are stored under ambient conditions. The surviving microorganisms can contaminate or spoil the food by producing toxins that are harmful to humans and pet animals.

Two-heat of the resistant bacterial microorganisms found in food products. such as meat, are *Bacillus* and *Clostridium* and the food products are needed to be heated above 100° C. in sealed containers such as pressure cookers to deactivate and kill the spores from these two microorganisms. Although 100° C. or temperatures close to 100° C. may be sufficient to fully cook the food products in the can, in one embodiment the food products are needed to be heated at or above 100° C. to kill the microorganisms to achieve a sterilized product. In another embodiment, the food products in the can are needed to be heated by water or steam or live steam so the temperature of the food product can reach 100° C. or higher to kill the microorganisms to achieve a sterilized product.

*Clostridium* is more heat-resistant than *Bacillus* between the two groups of spore-producing microorganisms. An exposure to a temperature of 110° C. will kill most of the *Bacillus* spores within a short time while an exposure to a higher temperature of 121° C. are needed to kill the *Clostridium* spores within a relatively short time. In one embodiment, the products are kept for a defined period of time at temperature levels required for the sterilization depending on type of product. In another embodiment, the products are kept for a defined period of time at temperature levels required for the sterilization depending on the size of container.

In one embodiment, the retort temperature required for sterilization of the food in the can is at or above 105° C. In another embodiment, the retort temperature required for sterilization of the food in the can is at or above 110° C. In another embodiment, the retort temperature required for sterilization of the food in the can is at or above 115° C. In another embodiment, the retort temperature required for sterilization of the food in the can is at or above 120° C. In another embodiment, the retort temperature required for sterilization of the food in the can is at or above 121° C. In another embodiment, the retort temperature required for sterilization of the food in the can is at or above 125° C.

In one embodiment, the time of exposure during the retort process required for both cooking and sterilization of the food in the can is at least 30 minutes. In another embodiment, the time of exposure during the retort process required for both cooking and sterilization of the food in the can is at least 60 minutes. In another embodiment, the time of exposure during the retort process required for both cooking and sterilization of the food in the can is at least 90 minutes.

One requirement of the sealed cans needs to be that they are made from material which when exposed to food during cooking, sterilization and storage on the inside and to steam and hot aqueous fluids during cooking, sterilization and ambient environmental storage conditions on the outside will not undergo chemical or structural changes such as corrosion, discoloration, oxidation, hydrolysis and degradation. Another requirement of the sealed cans also needs to be that they are made from material that will withstand the elevated temperatures experienced during cooking and sterilization by not undergoing chemical or structural changes such as corrosion, discoloration, oxidation, hydrolysis and degradation both inside and outside the can. The sealed cans for containing or storing canned foods will need to be made from material that will allow the food to be safely at least partially cooked or preferably fully cooked and wil allow for ful heat sterilization for food inside the cans without contaminating or introducing any unwanted materials or leaching unwanted materials into the food. The sealed cans for containing or storing canned foods will need to be made from material that will not change or modify the appearance of the external surface of the cans. Metal cans for food products are usually made from steel, tin-free steel, electro-tin-plated steel or aluminum. Although they can at least partially satisfy a number of the above-mentioned requirements or functionalities during cooking, sterilization and storage, the metals by themselves cannot provide all the above-mentioned requirements or functionalities. This is especially true when the metals cans are subject to high temperature during cooking, sterilization and storage on the inside and when subject to steam and hot aqueous fluids during cooking and sterilization and ambient storage conditions during its shelf-life on the outside. The metals have a potential to undergo chemical or structural changes such as corrosion, discoloration, oxidation, hydrolysis and degradation. In one embodiment, polymer film or polymeric layer is adhered or bonded to inner and outer surfaces of the metal cans to provide barriers or protective barriers or interface layers for safe and stable environment during food preparation, sterilization and storage. In another embodiment, polymer film or polymeric layer is bonded to inner surfaces of the metal cans to provide barriers or protective barriers or interface layers for safe and stable environment during food preparation, sterilization and storage. In another embodiment, polymer film or polymeric layer is adhered or bonded to the outer surfaces of the metal cans to provide barriers or protective barriers or interface layers for safe and stable environment during food preparation, sterilization and storage.

The metal substrate is primarily in sheet form having a substantially uniform thickness. In one embodiment, thickness of the metal sheet is in the range of about 50 µm to about 1300 µm (about 2 mils to about 50 mils). In another embodiment, thickness of the metal sheet is in the range about 150 µm to about 300 µm (about 6 mils to about 12 mils).

In one embodiment, the polymer film or polymeric layer is adhered or bonded to inner and outer surfaces of the metal cans to provide barriers or protective barriers or interface layers to prevent corrosion of the can, prevent contamination of the food and beverages with dissolved metals, prevent the formation and growth of bacteria and provide a safe and stable environment during food preparation, sterilization and storage. In another embodiment, polymer film or polymeric layer is adhered or bonded to inner surfaces of the metal cans to provide barriers or protective barriers or interface layers to prevent corrosion of the can, prevent contamination of the food and beverages with dissolved metals, prevent the formation and growth of bacteria and provide a safe and stable environment during food preparation, sterilization and storage. In another embodiment, the polymer film or polymeric layer is adhered or bonded to outer surfaces of the metal cans to provide barriers or protective barriers or interface layers to prevent corrosion of the can, prevent contamination of the food and beverages with dissolved metals, prevent the formation and growth of bacteria and provide for safe and stable environment during food preparation, sterilization and storage.

The polymer films or polymeric layers are adhered or bonded or incorporated onto the surface of the metal or metal substrate that are used to make the cans by laminating polymer films on either one side of the metal can or substrate or on both sides of the metal can or substrate. For the purpose of this invention or application, the side of the metal can or substrate used to the make the can that is in contact with the food or facing the interior contents of the can or is in contact with the food and facing the interior contents of the can will be referenced or called the interior surface or the internal surface or the inner surface. For the purpose of this invention or application, the side of the metal can or substrate used to the make the can that is not in direct contact with the food and is in contact with the outside or faces the ambient environmental conditions during storage or is subjected directly to the externally applied heat during cooking of the food after they have been placed in the can or is subjected directly to the externally applied heating media during cooking and sterilization of the food after they have been placed in the can will be referenced or called the exterior surface or the external surface or the outer surface.

In one embodiment, these polymer films or polymeric layers or barrier films are laminated onto both sides of the metal cans or metal substrate so that the inner and outer sides of the metal surfaces of the container are protected from corrosion, discoloration, oxidation, hydrolysis and degradation both from external ambient environmental conditions as well as cooking and sterilization associated with the retort process. In another embodiment, these polymer films or polymeric layers or barrier films are laminated by application of heat onto both sides of the metal so that the inner and outer side metal surfaces of the container are protected from corrosion, discoloration, oxidation hydrolysis and degradation both from external ambient environmental conditions as well as, cooking and sterilization associated with the retort process. In another embodiment, these polymer films or polymeric layers or barrier films can be laminated onto both sides of the metal by application of heat to fuse the polymer on to the metal so that the inner and outer side metal surfaces of the container are protected from corrosion, discoloration, oxidation hydrolysis and degradation both from external ambient environmental conditions as well as, cooking and sterilization associated with the retort process. In one embodiment, these polymer films or polymeric layers or barrier films are made from polyesters such as polyethylene terephthalate or PET or its blend and are laminated onto both sides of the metal so that the inner and outer side metal surfaces of the container are protected from degradation by the contained food material inside the can and the external ambient environment, respectively, both sides during the cooking and sterilization associated with the retort process. In another embodiment, these polymer films or polymeric layers or barrier films are made from polyesters such as PET or its blend are laminated by application of heat onto both sides of the metal so that the inner and outer side metal surfaces of the container are protected from degradation by the contained material food material inside the can and the external ambient environment, respectively, and both sides during the cooking and sterilization of the retort process. In another embodiment, these polymer films or polymeric layers or barrier films are made from polyesters such as PET or its blend and can be laminated onto both sides of the metal by application of heat to fuse the polymer on to the metal so that the inner and outer side metal surfaces of the container are protected from degradation by the contained material food material inside the can and the external ambient environment, respectively, and both sides during the cooking and sterilization associated with the retort process.

In one embodiment, the thickness of the polymer film is in the range of about 1 µm to 80 µm. In another embodiment, the thickness of the polymer film is in the range of about 1 µm to 50 µm. In another embodiment, the thickness of the polymer film is in the range of about 1 µm to 20 µm. In another embodiment, the thickness of the polymer film is in the range of about 1 µm to 15 µm. In another embodiment, the thickness of the polymer film is in the range of about 1 µm to 10 µm.

In one embodiment, the containers made from metal-polymer laminate, after they are filled and exposed to the retort process, the exterior surface or the external surface of the polymer and metal laminate structure of the container is able to withstand processing conditions experienced as a result of direct contact with heated water, heated aqueous media, steam or live steam during the retort process by not displaying or demonstrating effects of chemical or structural changes such as corrosion, discoloration, oxidation hydrolysis and degradation. In another embodiment, the containers, made from metal-polymer laminate, after they are filled and are exposed to a retort process, the interior surface or the internal surface of the polymer and metal laminate structure of the container be able to withstand processing conditions experienced as a result of direct contact with chemicals in the food and chemically aggressive foods during the retort processing by not displaying or demonstrating effects of chemical or structural changes such as corrosion, discoloration, oxidation, hydrolysis and degradation, and leaching unwanted materials into the food. The hydrolysis or accelerated hydrolysis or degradation triggered by contacting hot water, heated aqueous media, water vapor above 100° C. or live steam with the polymer films in the polymer and metal laminate structure during the retort process leads to discoloration or formation of cloudy spots in the polymer film and is termed blushing. The term blushing can be extended to include hydrolysis or accelerated hydrolysis or degradation triggered by contacting hot water, heated aqueous media, water vapor above 100° C. or live steam with the polymer films such as polyester films or polyester blended films in the polymer and metal laminate structure during the retort process leading to structural changes or compositional changes or discoloration or formation of cloudy spots in the polymer film. The term blushing can be further extended to include hydrolysis or accelerated hydrolysis or degradation triggered by contacting hot water, heated aqueous media, water vapor above 100° C., or live steam with the polymer films such as polyester films comprising polyethylene terephthalate or PET film or comprising blends of PET with another crystallizable polyester in the polymer and metal laminate structure during the retort process leading to discoloration or formation of cloudy spots in the polymer film.

The retort process can cause blushing by adversely affecting the polymer in the polymer and metal laminate structure of the container by the causing hydrolysis, or degradation or both hydrolysis and degradation of the polymeric film surface on the outer side of the container owing to its exposure by heating medium such as hot water, heated aqueous media, and live steam during the retort process. The retort process can cause blushing by adversely affecting the polymer in the polymer and metal laminate structure of the container by the causing hydrolysis of the polymer film surface such as polyester film surface on the outer side of the container owing to its exposure by heating medium such as hot water, heated aqueous media, and steam during the retort process. The retort process can cause blushing by adversely affecting the polymer in the polymer and metal laminate structure of the container by the causing hydrolysis of the PET film surface or the PET blended with another crystallizable polyester film surface on the external surface of the container owing to its exposure by heating medium such as hot water and steam during the retort process. The retort process can cause blushing by adversely affecting the polymer in the polymer and metal laminate structure of the container by the causing hydrolysis or degradation or both hydrolysis and degradation of the polyester film surface on the inner side of the container owing to its exposure by hot cooking medium, such as aqueous medium, during the retort process.

In one embodiment, the polymer in the polymer and metal laminate structure for safe and stable environment during food preparation, sterilization and storage include but not limited to polyesters. In another embodiment, the polymer in the polymer and metal laminate structure for safe and stable environment during food preparation, sterilization and storage is a polyester. In another embodiment, the polymer in the polymer and metal laminate structure for safe and stable environment during food preparation, sterilization and storage is a polyester such as polyethylene terephthalate or PET. In another embodiment, the polymer in the polymer and metal laminate structure for safe and stable environment during food preparation, sterilization and storage is PET.

In one embodiment, the polymer in the polymer and metal laminate structure for safe and stable environment during food preparation, sterilization and storage is a blend of two or more polyesters. In another embodiment, the polymer in the polymer and metal laminate structure for safe and stable environment during food preparation, sterilization and storage is a blend of PET with at least one other polyester. In another embodiment, the polymer in the polymer and metal laminate structure for safe and stable environment during food preparation, sterilization and storage is a blend of PET and one other polyester. In another embodiment, the polymer in the polymer and metal laminate structure for safe and stable environment during food preparation, sterilization and storage is a blend of PET and one other crystallizable polymer.

In another embodiment, the polymer in the polymer and metal laminate structure for safe and stable environment during food preparation, sterilization and storage is a blend of at least two semi crystalline polyesters. In another embodiment, the polymer in the polymer and metal laminate structure for safe and stable environment during food preparation, sterilization and storage is a blend of two semi-crystalline polyesters. In another embodiment, the polymer in the polymer and metal laminate structure for safe and stable environment during food preparation, sterilization and storage is a blend of two semi-crystalline polyesters comprising higher melting PET and lower melting polybutylene terephthalate (PBT). In another embodiment, the polymer in the polymer and metal laminate structure for safe and stable environment during food preparation, sterilization and storage is a blend of two semi-crystalline polyesters comprising PET with higher melting point and polybutylene terephthalate (PBT) with lower melting point. In another embodiment, the polymer in the polymer and metal laminate structure for safe and stable environment during food preparation, sterilization and storage is a blend of two semi-crystalline polyesters comprising higher melting PET and lower melting PBT.

In one embodiment, the polymer in the polymer and metal laminate structure for safe and stable environment during food preparation, sterilization and storage is modified polyester or modified PET or PET blend to add specific functionalities to the polymer layer in the metal-polymer laminate. In one embodiment, the polymer in the polymer and metal laminate structure for safe and stable environment during food preparation, sterilization and storage is a polyester modified by including and/or incorporating moieties into the polymer chain that will allow for ease of lamination by lowering the fusion temperature of the polyester or polyester blend. In another embodiment, the polymer in the polymer and metal laminate structure for safe and stable environment during food preparation, sterilization and storage is a polyester modified by including and/or incorporating moieties into the polymer chain that will allow for ease of lamination by lowering the lamination temperature by reducing the crystallinity of the polyester or polyester blend. In another embodiment, the polymer in the polymer and metal laminate structure for safe and stable environment during food preparation, sterilization and storage is polyethylene terephthalate modified by lowering the lamination temperature by reducing the crystallinity of higher melting polyester such as PET. In another embodiment, the polymer in the polymer and metal laminate structure for safe and stable environment during food preparation, sterilization and storage is PET modified by the presence or increasing the amount of lower melting polyester such as PBT that will melt at lower temperature and allow for lamination or fusion at lower temperature. In another embodiment, the polymer in the polymer and metal laminate structure for safe and stable environment during food preparation, sterilization and storage is PET or PET/PBT layer modified by attaching another layer to the PET or PET/PBT layer that will allow for ease of lamination by lowering the lamination temperature by making this additional layer comprising an amorphous polyester such as amorphous PET.

In one embodiment, the polymer in the polymer and metal laminate structure for safe and stable environment during food preparation, sterilization and storage is a polyester or polyester blend with higher molecular weight or higher intrinsic viscosity that will be resist the formation of cracks or gaps or holes which can occur due to corrosion, discoloration, oxidation, hydrolysis and degradation during the retort process or during long term storage. In another embodiment, the polymer in the polymer and metal laminate structure for safe and stable environment during food preparation, sterilization and storage is PET or a blend of PET with another polyester with either the PET or the PET blend having higher molecular weight or higher intrinsic viscosity that will be resist the formation of cracks or gaps or discoloration or holes which can occur due to hydrolysis and degradation during the retort process or during long term storage. Without being bound by any particular theory, having a higher molecular weight or higher intrinsic viscosity allows a polymer to withstand disruptive deformational forces by the virtue of higher entanglements and less chain ends. In one embodiment, having a higher molecular weight or higher intrinsic viscosity allows a polymer to withstand disruptive deformational forces by the virtue of higher entanglements and less chain carboxyl ends.

In one embodiment, the polymer in the polymer and metal laminate structure for safe and stable environment during food preparation, sterilization and storage is a polyester or polyester blend having a higher elongation to break that will be resist the formation of cracks or gaps or holes which can occur due to corrosion, discoloration, oxidation, hydrolysis and degradation during the retort process or during long term storage. In one embodiment, the polymer in the polymer and metal laminate structure for safe and stable environment during food preparation, sterilization and storage is PET or a blend of PET with another polyester having a higher elongation to break that will be resist the formation of cracks or gaps or holes which can occur due to corrosion, discoloration, oxidation, hydrolysis and degradation during the retort process or during long term storage. Without being bound by any theory, having a higher elongation to break allows a polymer or a polymer blend to withstand disruptive deformational forces and resist the formation of cracks or gaps or holes by the virtue of being more tough and less brittle.

In one embodiment, the polymer in the polymer and metal laminate structure for safe and stable environment during food preparation, sterilization and storage is a polyester that has a higher melting point in order to resist the formation of cracks or gaps or holes which can occur due to corrosion, discoloration, oxidation, hydrolysis and degradation during the retort process or during long term storage. In another embodiment, the polymer in the polymer and metal laminate structure for safe and stable environment during food preparation, sterilization and storage is a blend of at least two polyesters in which the higher melting point polyester undergoes least drop in its melting point after the formation of the blend in order to resist the formation of cracks or gaps or holes which can occur due to corrosion, discoloration, oxidation, hydrolysis and degradation during the retort process or during long term storage. In another embodiment, the polymer in the polymer and metal laminate structure for safe and stable environment during food preparation, sterilization and storage is a blend of at least two polyesters in which the higher melting point polyester undergoes least drop in its melting point and the lower melting point polyester undergoes no change or least changes in its melting point during the formation of the blend in order to resist the formation of cracks or gaps or holes and the resultant copolyester blend will resist corrosion, discoloration, oxidation hydrolysis and degradation during the retort process or during long term storage Higher melting point polyesters during the formation of the blend can partially incorporate themselves into or form other co-polyester copolymers or copolymers or transesterify, losing at least some of their crystallinity and lowering their melting point. Higher the amount of higher melting polymer, less likely that it forms co-polyester copolymers or copolymers or transesterifies. While not being bound by any particular theory, the loss or the partial loss of crystallinity makes the polyester or the polyester blend more susceptible to hydrolysis by hot water or heated aqueous media or steam or live steam during the retort process. The higher melting point polyester maintaining its higher melting point in the two polymer blend or a combination of the higher melting point maintaining its higher melting point and the same time, the lower melting point polyester undergoing no change or least changes in its melting point in the two polyester blend ensures higher crystallinity of the higher melting point polyester, lower co-polyester copolymer formation or lower transesterification and these will help to withstand disruptive deformational and environmental forces necessary to resist the formation and propagation of cracks or gaps or holes or discoloration in the polyester or polyester blend that can arise from hydrolysis or from hydrolysis and degradation of polymers such as polyesters or polyester blends. Retaining of the higher melting point in the polyester or the polyester blend is one way to ensure that the polyester or the polyester blend is more semi-crystalline in nature.

In another embodiment, the polymer in the polymer and metal laminate structure for safe and stable environment during food preparation, sterilization and storage comprises a semi-crystalline PET that has a higher melting point. In another embodiment, the polymer in the polymer and metal laminate structure for safe and stable environment during food preparation, sterilization and storage is a semi-crystalline PET that has a higher melting point. In another embodiment, the polymer in the polymer and metal laminate structure for safe and stable environment during food preparation, sterilization and storage comprises a blend of at least two polyesters in which the higher melting point polyester, PET, undergoes least drop in its melting point after the formation of the blend or after its transformation into a polymeric film. In another embodiment, the polymer in the polymer and metal laminate structure for safe and stable environment during food preparation, sterilization and storage is a blend of at least two polyesters in which the higher melting point polyester, PET, undergoes least drop in its melting point and the lower melting point polyester, that is also semi-crystalline, undergoes no change or least changes in its melting point during the formation of the blend or after its transformation into a polymeric film. The resultant polyester blended film of PET will resist the formation of cracks or gaps or holes or discoloration in the polyester or polyester blend that can arise from hydrolysis or hydrolysis and degradation of polymers such as polyesters or polyester blends during the retort process or during long term storage. Without being bound by any particular theory, maintaining the higher melting point for the higher melting point polyester, PET, in the two polymer blend or maintaining the higher melting point for the higher melting point polyester, PET, and the same time, the lower melting point polyester undergoes no change or least changes in its melting point in the two polymers blend ensures higher crystallinity of the blend or higher crystallinity of PET that will withstand disruptive deformational forces that results in the formation and propagation of cracks or gaps or holes or discoloration in the polyester or the polyester blend during the retort process or during long term storage. The higher crystallinity of the PET or PET blend will potentially arrest the formation of the cracks and the propagation of the cracks into larger defects of holes. The polymer in the polymer and metal laminate structure for safe and stable environment during food preparation, sterilization and storage is a blend of at least two polyesters. While the lower melting point polyester, PBT, undergoes no change or least changes in its melting point during the formation of the blend, the higher melting point polyester, PET, owing to incorporation of the blushing-retardant or blushing controlling component experiences least drop in its melting point. The resultant polyester blend will resist corrosion, discoloration, oxidation, hydrolysis and degradation during the retort process that can lead to the formation of cracks or gaps or holes associated with blushing.

The higher melting point polyester, PET, maintaining its higher melting point or experiencing lower drops in its melting point compared to its value prior to blending or a combination of the higher melting point PET maintaining its higher melting point and the same time, the lower melting point polyester, PBT, undergoing no change or least changes in its melting point ensures higher crystallinity of the higher melting point polyester, PET, or lower the potential for co-polyester copolymer formation. Retaining the higher melting point for the PET in the polyester blend is one way to ensure that the polyester or the polyester blend is more semi-crystalline in nature. Thus, maintaining the higher melting point of PET will help to withstand disruptive deformational and environmental forces necessary to resist the formation and propagation of cracks or gaps or holes or discoloration associated with blushing in the polyester or polyester blend that can arise from hydrolysis or from hydrolysis and degradation of polyesters or polyester blends.

In one embodiment, the polymer in the polymer and metal laminate structure for safe and stable environment during food preparation, sterilization and storage comprises a blend of one or more polyesters with PET being the higher melting point polyester and having higher molecular weight or intrinsic viscosity, having a higher elongation to break. In another embodiment, the polymer in the polymer and metal laminate structure for safe and stable environment during food preparation, sterilization and storage is a blend of one or more polyesters with PET being the higher melting point polyester and having higher molecular weight or intrinsic viscosity, having a higher elongation to break. In another embodiment, the higher melting point PET in a two polymer blend maintains a higher melting point and the same time, the lower melting point polyester undergoes no change or least changes in its melting point in the two polymers blend system in order to withstand disruptive environmental forces that resists the formation and propagation of cracks or gaps or holes or discoloration in the polyester or the polyester blend during the retort process or during long term storage. In one embodiment, the polymer in the polymer and metal laminate structure for safe and stable environment during food preparation, sterilization and storage comprises a blend of one or more polyesters with PET being the higher melting point polyester and the blend having higher molecular weight or intrinsic viscosity, having a higher elongation to break, maintaining the higher melting point for PET in a two polymer blend or maintaining the higher melting point for the higher melting point polyester, PET, and the same time, the lower melting point polyester undergoes no change or least changes in its melting point in the two polymers blend system in order to withstand disruptive environmental forces that resists the formation and propagation of cracks or gaps or holes or discoloration in the polyester or polyester blend formed during retort process or during long term storage and that can arise or attributable to corrosion, discoloration, oxidation, hydrolysis and degradation.

In one embodiment, PET blend with high molecular weight or intrinsic viscosity helps in reducing blushing by resisting the formation of cracks or gaps or holes during the retort process or during long term storage. In another embodiment, PET blend with higher elongation to break helps in reducing blushing resisting the formation of cracks or gaps or holes during the retort process or during the retort process or during long term storage. In another embodiment, PET blends with lower number of terminal groups or lower number of carboxyl end groups in the PET help in reducing blushing and resisting the formation of cracks or gaps or holes during the retort process or during long term storage. In another embodiment, PET with higher melting point, helps in reducing blushing and resisting the formation of cracks or gaps or holes during the retort process or continuing during long term storage. However, it has been noted as part of an embodiment herein, that although all the aforementioned features in PET or modified PET or PET blend do not completely eliminate or substantially remove or satisfactorily prevent the formation of blush especially for retort process using higher temperatures or for retort process with longer residence exposure at lower temperatures.

In one embodiment, the polymer in the polymer and metal laminate structure for safe and stable environment during food preparation, sterilization and storage is a blend comprising of PET and one or more faster crystallizing but lower melting point polyesters to resist the formation of cracks or gaps or holes or discoloration associated with hydrolysis or hydrolysis and degradation during the retort process or continuing during long term storage In another embodiment, the polymer in the polymer and metal laminate structure for safe and stable environment during food preparation, sterilization and storage is a block copolymer comprising of PET and one or more faster crystallizing polyesters but lower melting point polyesters to resist the formation of cracks or gaps or holes or discoloration associated with hydrolysis and degradation during the retort process or during long term storage.

Without being bound by any particular theory, the faster crystallizing polyester crystallizes early or first and provide for potentially more nucleation or additional nucleation sites for the subsequent crystallization of PET leading to a higher overall crystallinity content that will resist blushing and the formation and propagation of the crack or formation of gaps or holes or discoloration allowing the polymer to withstand disruptive deformational an environmental force during the retort processing or continuing during long term storage. Faster crystallizing polyester can have a large effect on increasing the crystallization rate of the slower crystalizing PET and can affect the PET in both block polyester copolymers and polyester blends. Higher crystallinity of PET can potentially also make the polymer blends or block copolymers more difficult to laminate or fuse to the metal in the polymer and metal laminate but the bonding or fusion to the metal surface is preferably controlled by the presence and amount of the lower melting point and faster crystallizing polyester whose lower melting point will allow for fusing at lower temperature leading to lamination at lower temperature. Thus, it is important to control the amount of faster crystallizing polyester in its blend with PET both for allowing to retain higher crystallinity of PET and for having lower fusion or laminate processing temperature.

Without being bound by any particular theory, the blend or block copolymer comprising PET and a faster crystallizing lower melting point polyester can lead to tensile properties such as higher elongation to break that imparts or results in higher toughness that will resist blushing and resist blushing and the formation of cracks or gaps or holes which can occur due to corrosion, discoloration, oxidation hydrolysis and degradation during the retort process or during long term storage. An embodiment herein discloses a composition in which the melting point of PET in a two-component blend will be slightly lower or somewhat lower than that of pure PET but it will resist the formation of cracks or gaps or holes which can occur due to corrosion, discoloration, oxidation hydrolysis and degradation during the retort process or during long term storage. If the melting point of PET in a two-component blend is far lower than that of pure PET, it will not be able to resist the formation of cracks or gaps or holes and will resist corrosion, discoloration, oxidation hydrolysis and degradation during the retort process or during long term storage. It had been reported that blending PET with faster crystallizing and lower melting point polyester such as polybutylene terephthalate (PBT) improves the blush resistance of the polymer in the polymer and metal laminate structure of the container. PBT is lower melting and faster crystallizing polyester compared to PET and it is added to provide all the advantages of blending PET with PBT or forming a block copolymer of PET with PBT such as resisting the formation of cracks or gaps or holes and resisting corrosion, discoloration, oxidation, hydrolysis and degradation during the retort process or during long term storage. However, blending of PBT with PET do not completely eliminate or substantially remove or satisfactorily prevent the formation of blush especially for retort process using higher temperatures or for retort process with longer residence exposure at lower temperatures.

In an embodiment herein, it has been observed that films containing PBT in PET/PBT blend do not provide satisfactory level of blushing reduction as observed by performing the Blush resistance test described later in Test Method Section.

As a part of an embodiment herein, it has also been observed that films containing PBT in PET/PBT blend do not provide satisfactory level of blushing reduction or completely eliminate or substantially remove blushing even with high levels of PBT. In other words, the formation of blush especially from the retort process using higher temperatures or retort process with longer residence exposure at lower temperatures is not completely eliminated or substantially reduced. In order to provide satisfactory level of blushing reduction, the present discloses a composition comprising a blend of PET and PBT and blushing-retardant or blushing controlling component that can withstand the retort conditions in which the temperature is above 115° C. and the composition demonstrates minimal blushing or no blushing. In another embodiment, the present discloses a composition comprising a blend of PET and PBT and blushing-retardant or blushing controlling component that can withstand the retort conditions in which the temperature is above 115° C. and the composition demonstrates no blushing where the film is completely clear with no hazing or clouding. In another embodiment, the present discloses a composition comprising a blend of PET and PBT and blushing-retardant or blushing controlling component that can withstand the retort conditions in which the temperature is above 115° C. the composition demonstrates isolated areas of hazing or clouding.

In order to provide satisfactory level of blushing reduction, the present discloses a composition comprising a blend of PET and PBT and blushing-retardant or blushing controlling component that can withstand the retort conditions in which the temperature is above 120° C. and the composition demonstrate minimal blushing or no blushing. In another embodiment, the present discloses a composition comprising a blend of PET and PBT and blushing-retardant or blushing controlling component that can withstand the retort conditions in which the temperature is above 120° C. and the composition demonstrates no blushing where the film is completely clear with no hazing or clouding. In another embodiment, the present discloses a composition comprising a blend of PET and PBT and blushing-retardant or blushing controlling component that can withstand the retort conditions in which the temperature is above 120° C. the composition demonstrates isolated areas of hazing or clouding.

In order to provide satisfactory level of blushing reduction, the present discloses a composition comprising a blend of PET and PBT and blushing-retardant or blushing controlling component that can withstand the retort conditions in which the temperature is above 125° C. and the composition demonstrate minimal blushing or no blushing. In another embodiment, the present discloses a composition comprising a blend of PET and PBT and blushing-retardant or blushing controlling component that can withstand the retort conditions in which the temperature is above 125° C. and the composition demonstrates no blushing where the film is completely clear with no hazing or clouding. In another embodiment, the present discloses a composition comprising a blend of PET and PBT and blushing-retardant or blushing controlling component that can withstand the retort conditions in which the temperature is above 125° C. the composition demonstrates isolated areas of hazing or clouding.

In one embodiment, an embodiment herein discloses a composition for the polymer in the polymer and metal laminate structure of the container for food products that comprises a blushing controlling component and a blend of PET and PBT to prevent blushing of the polymer film during the retort process. In another embodiment, an embodiment herein discloses a composition for the polymer in the polymer and metal laminate structure of the container for food products that comprises a blushing-retardant and a blend of PET and PBT to prevent blushing of the polymer film during the retort process.

An embodiment herein discloses a composition for the polymer in the polymer and metal laminate structure of the container for food products that comprises a blushing controlling component or blushing-retardant and a blend of PET and PBT to prevent blushing of the polymer film during the retort process where the retort temperature is at or above 110° C. In another embodiment, an embodiment herein discloses a composition for the polymer in the polymer and metal laminate structure of the container for food products that comprises a blushing controlling component or blushing-retardant and a blend of PET and PBT to prevent blushing of the polymer film during the retort process where the retort temperature is at or above 115° C. In another embodiment, an embodiment herein discloses a composition for the polymer in the polymer and metal laminate structure of the container for food products that comprises a blushing controlling component or blushing-retardant and a blend of PET and PBT to prevent blushing of the polymer film during the retort process where the retort temperature is at or above 120° C. In another embodiment, an embodiment herein discloses a composition for the polymer in the polymer and metal laminate structure of the container for food products that comprises a blushing controlling component or blushing-retardant and a blend of PET and PBT to prevent blushing of the polymer film during the retort process where the retort temperature is at or above 125° C.

An embodiment herein discloses a composition for the polymer in the polymer and metal laminate structure of the container for food products that comprises a blushing controlling component or blushing-retardant and a blend of PET and PBT with the intrinsic viscosity being greater than 0.75 to prevent blushing of the polymer film during the retort process. In another embodiment, an embodiment herein discloses a composition for the polymer in the polymer and metal laminate structure of the container for food products that comprises a blushing controlling component or blushing-retardant and a blend of PET and PBT with the intrinsic viscosity being greater than 0.76 to prevent blushing of the polymer film during the retort process. In another embodiment, an embodiment herein discloses a composition for the polymer in the polymer and metal laminate structure of the container for food products that comprises a blushing controlling component or blushing-retardant and a blend of PET and PBT with the intrinsic viscosity being greater than 0.77 to prevent blushing of the polymer film during the retort process. In another embodiment, an embodiment herein discloses a composition for the polymer in the polymer and metal laminate structure of the container for food products that comprises a blushing controlling component or blushing-retardant and a blend of PET and PBT with the intrinsic viscosity being greater than 0.80 to prevent blushing of the polymer film during the retort process. In another embodiment, an embodiment herein discloses a composition for the polymer in the polymer and metal laminate structure of the container for food products that comprises a blushing controlling component or blushing-retardant and a blend of PET and PBT with the intrinsic viscosity being around 0.90 to prevent blushing of the polymer film during the retort process. In another embodiment, an embodiment herein discloses a composition for the polymer in the polymer and metal laminate structure of the container for food products that comprises a blushing controlling component or blushing-retardant and a blend of PET and PBT with the intrinsic viscosity being greater than 0.90 to prevent blushing of the polymer film during the retort process.

An embodiment herein discloses a composition for the polymer in the polymer and metal laminate structure of the container for food products that comprises a blushing controlling component or blushing-retardant and a blend of PET and PBT with the intrinsic viscosity being greater than 0.75 to retard and minimize blushing of the polymer film during the retort process. In another embodiment, an embodiment herein discloses a composition for the polymer in the polymer and metal laminate structure of the container for food products that comprises a blushing controlling component or blushing-retardant and a blend of PET and PBT with the intrinsic viscosity being greater than 0.76 to retard and minimize blushing of the polymer film during the retort process. In another embodiment, an embodiment herein discloses a composition for the polymer in the polymer and metal laminate structure of the container for food products that comprises a blushing controlling component or blushing-retardant and a blend of PET and PBT with the intrinsic viscosity being greater than 0.77 to retard and minimize blushing of the polymer film during the retort process. In another embodiment, an embodiment herein discloses a composition for the polymer in the polymer and metal laminate structure of the container for food products that comprises a blushing controlling component or blushing-retardant and a blend of PET and PBT with the intrinsic viscosity being greater than 0.80 to retard and minimize blushing of the polymer film during the retort process. In another embodiment, an embodiment herein discloses a composition for the polymer in the polymer and metal laminate structure of the container for food products that comprises a blushing controlling component or blushing-retardant and a blend of PET and PBT with the intrinsic viscosity being around 0.90 to retard and minimize blushing of the polymer film during the retort process. In another embodiment, an embodiment herein discloses a composition for the polymer in the polymer and metal laminate structure of the container for food products that comprises a blushing controlling component or blushing-retardant and a blend of PET and PBT with the intrinsic viscosity being greater than 0.90 to retard and minimize blushing of the polymer film during the retort process.

An embodiment herein discloses a composition for the polymer in the polymer and metal laminate structure of the container for food products that comprises a blushing controlling component or blushing-retardant and a blend of PET and PBT with the PBT content being about or above or at least 40% to prevent blushing of the polymer film during the retort process. In another embodiment, a composition for the polymer in the polymer and metal laminate structure of the container for food products that comprises a blushing controlling component or blushing-retardant and a blend of PET and PBT with the PBT content being about or above or at least 50% to prevent blushing of the polymer film during the retort process. In another embodiment, a composition for the polymer in the polymer and metal laminate structure of the container for food products that comprises a blushing controlling component or blushing-retardant and a blend of PET and PBT with the PBT content being about or above or at least 55% to prevent blushing of the polymer film during the retort process. In another embodiment, a composition for the polymer in the polymer in the polymer and metal laminate structure of the container for food products that comprises a blushing controlling component or blushing-retardant and a blend of PET and PBT with the PBT content being about or above or at least 60% to prevent blushing of the polymer film during the retort process. In another embodiment, a composition for the polymer in the polymer and metal laminate structure of the container for food products that comprises a blushing controlling component or blushing-retardant and a blend of PET and PBT with the PBT content being about or above or at least 70% to prevent blushing of the polymer film during the retort process.

An embodiment herein discloses a composition for the polymer in the polymer and metal laminate structure of the container for food products that comprises a blushing controlling component or blushing-retardant and a blend of PET and PBT with the PBT content being about or above or at least 40% to retard and minimize blushing of the polymer film during the retort process. In another embodiment, a composition for the polymer in the polymer and metal laminate structure of the container for food products that comprises a blushing controlling component or blushing-retardant and a blend of PET and PBT with the PBT content being about or above or at least 50% to retard and minimize blushing of the polymer film during the retort process. In another embodiment, a composition for the polymer in the polymer in the polymer and metal laminate structure of the container for food products that comprises a blushing controlling component or blushing-retardant and a blend of PET and PBT with the PBT content being about or above or at least 60% to retard and minimize blushing of the polymer film during the retort process. In another embodiment, a composition for the polymer in the polymer and metal laminate structure of the container for food products that comprises a blushing controlling component or blushing-retardant and a blend of PET and PBT with the PBT content being about or above or at least 70% to retard and minimize blushing of the polymer film during the retort process.

An embodiment herein discloses a composition for the polymer in the polymer and metal laminate structure of the container for food products that comprises a blushing controlling component or blushing-retardant and a blend of PET and PBT with the PBT content being about 40% to about 80% to prevent blushing of the polymer film during the retort process. In another embodiment, a composition for the polymer in the polymer and metal laminate structure of the container for food products that comprises a blushing controlling component or blushing-retardant and a blend of PET and PBT with the PBT content being about 50% to 70% to prevent blushing of the polymer film during the retort process. In another embodiment, a composition for the polymer in the polymer in the polymer and metal laminate structure of the container for food products that comprises a blushing controlling component or blushing-retardant and a blend of PET and PBT with the PBT content being about 50% to 65% prevent blushing of the polymer film during the retort process. In another embodiment, a composition for the polymer in the polymer and metal laminate structure of the container for food products that comprises a blushing controlling component or blushing-retardant and a blend of PET and PBT with the PBT content being about 51 to 64% to prevent blushing of the polymer film during the retort process. In another embodiment, a composition for the polymer in the polymer and metal laminate structure of the container for food products that comprises a blushing controlling component or blushing-retardant and a blend of PET and PBT with the PBT content being about 52 to 62% to prevent blushing of the polymer film during the retort process. In another embodiment, a composition for the polymer in the polymer and metal laminate structure of the container for food products that comprises a blushing controlling component or blushing-retardant and a blend of PET and PBT with the PBT content being about 53 to 60% to prevent blushing of the polymer film during the retort process.

An embodiment herein discloses a composition for the polymer in the polymer and metal laminate structure of the container for food products that comprises a blushing controlling component or blushing-retardant and a blend of PET and PBT with the PBT content being about 40% to about 80% to retard and minimize blushing of the polymer film during the retort process. In another embodiment, a composition for the polymer in the polymer and metal laminate structure of the container for food products that comprises a blushing controlling component or blushing-retardant and a blend of PET and PBT with the PBT content being about 50% to 70% to retard and minimize blushing of the polymer film during the retort process. In another embodiment, a composition for the polymer in the polymer in the polymer and metal laminate structure of the container for food products that comprises a blushing controlling component or blushing-retardant and a blend of PET and PBT with the PBT content being about 50% to 65% retard and minimize blushing of the polymer film during the retort process. In another embodiment, a composition for the polymer in the polymer and metal laminate structure of the container for food products that comprises a blushing controlling component or blushing-retardant and a blend of PET and PBT with the PBT content being about 52 to 58% to retard and minimize blushing of the polymer film during the retort process. In another embodiment, a composition for the polymer in the polymer and metal laminate structure of the container for food products that comprises a blushing controlling component or blushing-retardant and a blend of PET and PBT with the PBT content being about 53 to 57% to retard and minimize blushing of the polymer film during the retort process. In another embodiment, a composition for the polymer in the polymer and metal laminate structure of the container for food products that comprises a blushing controlling component or blushing-retardant and a blend of PET and PBT with the PBT content being about 54 to 56% to retard and minimize blushing of the polymer film during the retort process.

An embodiment herein discloses a composition for the polymer in the polymer and metal laminate structure of the container for food products that comprises a blushing controlling component or blushing-retardant and a blend of PET and PBT with the blushing controlling component or blushing-retardant content being about 0.01% to about 1% of the overall PET and PBT blend composition to prevent blushing of the polymer film during the retort process. In another embodiment, an embodiment herein discloses a composition for the polymer in the polymer and metal laminate structure of the container for food products that comprises a blushing controlling component or blushing-retardant and a blend of PET and PBT with the blushing controlling component or blushing-retardant content being about 0.025% to about 0.8% of the overall PET and PBT blend composition to prevent blushing of the polymer film during the retort process. In another embodiment, an embodiment herein discloses a composition for the polymer in the polymer and metal laminate structure of the container for food products that comprises a blushing controlling component or blushing-retardant and a blend of PET and PBT with the blushing controlling component or blushing-retardant content being about 0.05% to about 0.6% of the overall PET and PBT blend composition to prevent blushing of the polymer film during the retort process. In another embodiment, an embodiment herein discloses a composition for the polymer in the polymer and metal laminate structure of the container for food products that comprises a blushing controlling component or blushing-retardant and a blend of PET and PBT with the blushing controlling component or blushing-retardant content being about 0.05% to about 0.3% of the overall PET and PBT blend composition to prevent blushing of the polymer film during the retort process.

An embodiment herein discloses a composition for the polymer in the polymer and metal laminate structure of the container for food products that comprises a blushing controlling component or blushing-retardant and a blend of PET and PBT with the blushing controlling component or blushing-retardant content being about 0.01% to about 1% of the overall PET and PBT blend composition to retard and minimize blushing of the polymer film during the retort process. In another embodiment, an embodiment herein discloses a composition for the polymer in the polymer and metal laminate structure of the container for food products that comprises a blushing controlling component or blushing-retardant and a blend of PET and PBT with the blushing controlling component or blushing-retardant content being about 0.025% to about 0.8% of the overall PET and PBT blend composition to retard and minimize blushing of the polymer film during the retort process. In another embodiment, an embodiment herein discloses a composition for the polymer in the polymer and metal laminate structure of the container for food products that comprises a blushing controlling component or blushing-retardant and a blend of PET and PBT with the blushing controlling component or blushing-retardant content being about 0.05% to about 0.6% of the overall PET and PBT blend composition to retard and minimize blushing of the polymer film during the retort process. In another embodiment, an embodiment herein discloses a composition for the polymer in the polymer and metal laminate structure of the container for food products that comprises a blushing controlling component or blushing-retardant and a blend of PET and PBT with the blushing controlling component or blushing-retardant content being about 0.05% to about 0.3% of the overall PET and PBT blend composition to retard and minimize blushing of the polymer film during the retort process.

The surface roughness, Ra, of the exposed outer surfaces skin layers each independently may be about 5-350 nm, preferably 10-250 nm, and more preferably 15-150 nm.

In one embodiment, the blushing controlling component or blushing-retardant comprise phosphite, diphosphite, phosphate, diphosphate, phosphonate, di phosphonate, phosphepin, phosphonoacetate, polyphosphoric acid, phosphoric acid, or combinations thereof. In another embodiment, the blushing controlling component or blushing-retardant comprises phosphite or diphosphite or combinations thereof. In another embodiment, the blushing controlling component or blushing-retardant comprises phosphate. In another embodiment, the blushing controlling component or blushing-retardant comprises phosphonate. In another embodiment, the blushing controlling component or blushing-retardant comprises polyphosphoric acid.

The invention discloses that phosphonate or a mixture of phosphonate and phosphate or a phosphate have been unexpectedly found to bring about least changes in its melting point of PET in the two polyester blend ensuring higher crystallinity of the higher melting PET, lower or minimal co-polyester copolymer formation or lower or minimal transesterification during the preparation of the PET/PBT blend films. This was surprising as both the blend components were crystallizable or semi-crystalline polyesters which is more likely or has the potential to undergo transesterification during the retort process conditions using higher temperatures or longer times. As both components are polyesters, the present invention is unlike situations where one component can be an amorphous polymer such as polycarbonate and which is less likely to transesterify or form polyester copolymers.

In one embodiment, the blushing controlling component or blushing-retardant comprises phosphite or diphosphite but does not include, bis(2,6-di-t-butyl-4-methylphenyl) pentaerythritol dibenzophosphite, bis(2,6-di-t-butyl-4-methylphenyl)pentaerythritol diphosphite, bis(2,4-dicumylphenyl)pentaerythritol diphosphite, 2-[[2,4,8,10-tetrakis(1,1-dimethylether)dibenzo[d,f][1,3,2]dioxaphosphepin-6-yl] oxy]-N,N-bis[2-[2,4,8,10-tetrakis(1,1-dimethyletherdibenzo[d,f][1,3-,2]dioxaphosphepin-6-yl) oxy]ethyl]ethanolamine, diphenyl isodecylphosphite, triphenyl phosphite and bis(acetodeca)pentaerythritol diphosphite.

In one embodiment, the blushing controlling component or blushing-retardant comprises phosphate. In another embodiment, the blushing controlling component or blushing-retardant comprises alkyl phosphate which further comprises a pentaerythritol structure. In another embodiment, the blushing controlling component or blushing-retardant comprises pentaerythritol phosphate. In another embodiment, the blushing controlling component or blushing-retardant comprises pentaerythritol di-phosphate. In another embodiment, the blushing controlling component or blushing-retardant comprises pentaerythritol di-phosphate, pentaerythritol phosphate pentaerythritol phosphate or combinations thereof. In another embodiment, the blushing controlling component or blushing-retardant comprises alkyl phosphate but does not include trimethyl phosphate, tri-2-ethylhexyl phosphate, tris(2-chloroethyl)phosphate and bis(acetodeca)pentaerythritol diphosphite. In another embodiment, the blushing controlling component or blushing-retardant comprises alkyl phosphate but does not include trimethyl phosphate, triethyl phosphate, tributyl phosphate.

In one embodiment, the blushing controlling component or blushing-retardant comprises phosphonate. In another embodiment, the blushing controlling component or blushing-retardant comprises alkyl phosphonate. In another embodiment, the blushing controlling component or blushing-retardant comprises alkyl phosphonate which further comprises a pentaerythritol structure. In another embodiment, the blushing controlling component or blushing-retardant comprises a di-phosphonate. In another embodiment, the blushing controlling component or blushing-retardant comprises a di-phosphonate which further comprises a pentaerythritol structure. In another embodiment, the blushing controlling component or blushing-retardant comprises pentaerythritol phosphonate. In another embodiment, the blushing controlling component or blushing-retardant comprises pentaerythritol di-phosphonate. In another embodiment, the blushing controlling component or blushing-retardant comprises dialky pentaerythritol diphosphonate. In another embodiment, the blushing controlling component or blushing-retardant comprises pentacovalent phosphonate such as pentaerythritol diphosphonate or pentaerythritol phosphonate or combinations thereof. In another embodiment, the blushing controlling component or blushing-retardant comprises pentaerythritol di-phosphonate, pentaerythritol phosphate pentaerythritol phosphonate or combinations thereof.

In one embodiment, the blushing controlling component or blushing-retardant contains alkyl phosphonate. In another embodiment, the blushing controlling component or blushing-retardant contains alkyl phosphonate which further contains a pentaerythritol structure. In another embodiment, the blushing controlling component or blushing-retardant contains a di-phosphonate. In another embodiment, the blushing controlling component or blushing-retardant contains a di-phosphonate which further contains a pentaerythritol structure. In another embodiment, the blushing controlling component or blushing-retardant contains pentaerythritol di-phosphonate. In another embodiment, the blushing controlling component or blushing-retardant contains pentaerythritol di-phosphonate. In another embodiment, the blushing controlling component or blushing-retardant contains pentacovalent phosphonate such as pentaerythritol di-phosphonate or pentaerythritol phosphonate.

In one embodiment, the blushing controlling component or blushing-retardant comprises alkyl phosphonate, alkyl aryl phosphonate, aryl phosphonate combinations thereof. In one embodiment, the blushing controlling component or blushing-retardant comprises alkyl aryl phosphonate or an aryl phosphonate. In one embodiment, the blushing controlling component or blushing-retardant comprises alkyl aryl phosphonate or an aryl phosphonate but does not include benzyl ethyl phosphonate. In one embodiment, the blushing controlling component or blushing-retardant comprises alkyl phosphonate but does not include ethyl diethyl phosphonoacetate.

In one embodiment, the blushing controlling component or blushing-retardant comprises substantially phosphonate. In another embodiment, the blushing controlling component or blushing-retardant comprises at least 50% phosphonate. In another embodiment, the blushing controlling component or blushing-retardant comprises at least 60% phosphonate. In another embodiment, the blushing controlling component or blushing-retardant comprises at least 70% phosphonate. In another embodiment, the blushing controlling component or blushing-retardant comprises at least 85 phosphonate. In another embodiment, the blushing controlling component or blushing-retardant comprises at least 90% phosphonate. In another embodiment, the blushing controlling component or blushing-retardant comprises at least 95% of phosphonate. In another embodiment, the blushing controlling component or blushing-retardant comprises at least 97% of phosphonate. In another embodiment, the blushing controlling component or blushing-retardant comprises at least 99% of phosphonate.

In one embodiment, the blushing controlling component or blushing-retardant comprises substantially phosphate. In another embodiment, the blushing controlling component or blushing-retardant comprises at least 50% phosphate. In another embodiment, the blushing controlling component or blushing-retardant comprises at least 60% phosphate. In another embodiment, the blushing controlling component or blushing-retardant comprises at least 70% phosphate. In another embodiment, the blushing controlling component or blushing-retardant comprises at least 85% phosphate. In another embodiment, the blushing controlling component or blushing-retardant comprises at least 95% phosphate. In another embodiment, the blushing controlling component or blushing-retardant comprises at least 97% phosphate. In another embodiment, the blushing controlling component or blushing-retardant comprises at least 99% phosphate.

In one embodiment, the blushing controlling component or blushing-retardant is optionally not a phosphite. In another embodiment, the blushing controlling component or blushing-retardant is optionally does not contain a substantial amount of phosphite.

In another embodiment, the blushing controlling component or blushing-retardant comprises substantially phosphonate and minor amounts of other compounds containing phosphorous and oxygen. In another embodiment, the blushing controlling component or blushing-retardant comprises phosphonate and minor amounts of other compounds containing phosphorous and oxygen such as phosphites. In another embodiment, the blushing controlling component or blushing-retardant comprises phosphonate and minor amounts of other compounds containing phosphorous and oxygen such as phosphates. In another embodiment, the blushing controlling component or blushing-retardant comprises phosphonate and less than 20% of other compounds containing phosphorous and oxygen. In another embodiment, the blushing controlling component or blushing-retardant comprises phosphonate and less than 10% of other compounds containing phosphorous and oxygen. In another embodiment, the blushing controlling component or blushing-retardant comprises phosphonate and less than 3% of other compounds containing phosphorous and oxygen. In another embodiment, the blushing controlling component or blushing-retardant comprises phosphonate and less than 1% of other compounds containing phosphorous and oxygen.

In another embodiment, the blushing controlling component or blushing-retardant comprises phosphonate and less than 20% of other compounds containing phosphorous and oxygen such as phosphates. In another embodiment, the blushing controlling component or blushing-retardant comprises phosphonate and less than 10% of other compounds containing phosphorous and oxygen such as phosphates. In another embodiment, the blushing controlling component or blushing-retardant comprises phosphonate and less than 3% of other compounds containing phosphorous and oxygen such as phosphates. In another embodiment, the blushing controlling component or blushing-retardant comprises phosphonate and less than 1% of other compounds containing phosphorous and oxygen such as phosphates.

In another embodiment, the blushing controlling component or blushing-retardant comprises phosphate and minor amounts of other compounds containing phosphorous and. In another embodiment, the blushing controlling component or blushing-retardant comprises phosphate and minor amounts of other compounds containing phosphorous and oxygen such as phosphites. In another embodiment, the blushing controlling component or blushing-retardant comprises phosphate and minor amounts of other compounds containing phosphorous and oxygen such as phosphonates. In another embodiment, the blushing controlling component or blushing-retardant comprises phosphate and less than 20% of other compounds containing phosphorous and oxygen. In another embodiment, the blushing controlling component or blushing-retardant comprises phosphate and less than 10% of other compounds containing phosphorous and oxygen. In another embodiment, the blushing controlling component or blushing-retardant comprises phosphate and less than 3% of other compounds containing phosphorous and oxygen. In another embodiment, the blushing controlling component or blushing-retardant comprises phosphate and less than 1% of other compounds containing phosphorous and oxygen. The blushing controlling component or blushing-retardant comprises phosphate or a phosphonate or combinations thereof. The blushing controlling component or blushing-retardant further comprises phosphonate, di-phosphonate, pentaerythritol di-phosphonate or combinations thereof. The blushing controlling component or blushing-retardant further comprises phosphate, di-phosphate, pentaerythritol di-phosphate or combinations thereof. The blushing controlling component or blushing-retardant further comprises phosphonate, di-phosphonate, pentaerythritol di phosphonate, phosphate, di-phosphate, pentaerythritol di phosphate or combinations thereof.

One method of synthesis or manufacture of the blushing controlling component or blushing-retardant such as di phosphonate, phosphonate, pentaerythritol di phosphonate, pentaerythritol phosphonate, dialky pentaerythritol di-phosphonate, heterocyclic phosphonate or heterocyclic di phosphonate is by hydrolysis or hydrolysis followed by tautomerization of the corresponding phosphites to obtain the required phosphonates Another method of preparation is to use the methods described in U.S. Pat. No. 3,141,033 first to make dialky pentaerythritol di-phosphonate from the corresponding dialky pentaerythritol di-phosphite using Arbuzov rearrangement reactions and then converting dialky pentaerythritol di-phosphonate to pentaerythritol di-phosphonate. One method of synthesis or manufacture of the blushing controlling component or blushing-retardant such as di phosphate, phosphate, pentaerythritol di phosphate, pentaerythritol phosphate, dialky pentaerythritol di-phosphate, heterocyclic phosphate or heterocyclic di phosphate is by hydrolysis or hydrolysis followed by tautomerization of the corresponding phosphites to obtain the required phosphates.

An embodiment herein discloses a composition for the polymer film in the polymer and metal laminate structure of the container for food products that comprises a blushing controlling component or blushing-retardant and a blend of PET and PBT to prevent blushing of the polymer film during the retort process and the Differential Scanning calorimeter (DSC) measured melting point of PET in the polymer film ranged from 244.5° C. to 248.5° C. In another embodiment, an embodiment herein discloses a composition for the polymer film in the polymer and metal laminate structure of the container for food products that comprises a blushing controlling component or blushing-retardant and a blend of PET and PBT to prevent blushing of the polymer film during the retort process and the Differential Scanning calorimeter (DSC) measured average melting point of PET in the polymer film ranged from 244.5° C. to 248.5° C. In one embodiment, an embodiment herein discloses a composition for the polymer film in the polymer and metal laminate structure of the container for food products that comprises a blushing controlling component or blushing-retardant and a blend of PET and PBT to prevent blushing of the polymer film during the retort process and the DSC measured melting point of PET in the polymer film ranged from 244.5° C. to 250.5° C. In another embodiment, an embodiment herein discloses a composition for the polymer film in the polymer and metal laminate structure of the container for food products that comprises a blushing controlling component or blushing-retardant and a blend of PET and PBT to prevent blushing of the polymer film during the retort process and the DSC measured average melting point of PET in the polymer film ranged from 244.5° C. to 250.5° C.

An embodiment herein discloses a composition for the polymer film in the polymer and metal laminate structure of the container for food products that comprises a blushing controlling component or blushing-retardant and a blend of PET and PBT to prevent blushing of the polymer film during the retort process and the DSC measured melting point of PET in the polymer film is greater than 244.5° C. An embodiment herein discloses a composition for the polymer film in the polymer and metal laminate structure of the container for food products that comprises a blushing controlling component or blushing-retardant and a blend of PET and PBT to significantly reduce blushing of the polymer film during the retort process and the DSC measured melting point of the PET in polymer film is greater than 245.5° C. An embodiment herein discloses a composition for the polymer film in the polymer and metal laminate structure of the container for food products that comprises a blushing controlling component or blushing-retardant and a blend of PET and PBT to significantly reduce blushing of the polymer film during the retort process and the DSC measured melting point of the PET in polymer film is greater than 247.0° C. An embodiment herein discloses a composition for the polymer film in the polymer and metal laminate structure of the container for food products that comprises a blushing controlling component or blushing-retardant and a blend of PET and PBT to prevent blushing of the polymer film during the retort process and the DSC measured average melting point of PET in the polymer film is greater than 244.5° C. An embodiment herein discloses a composition for the polymer film in the polymer and metal laminate structure of the container for food products that comprises a blushing controlling component or blushing-retardant and a blend of PET and PBT to significantly reduce blushing of the polymer film during the retort process and the DSC measured average melting point of PET in the polymer film is greater than 245.5° C. An embodiment herein discloses a composition for the polymer film in the polymer and metal laminate structure of the container for food products that comprises a blushing controlling component or blushing-retardant and a blend of PET and PBT to significantly reduce blushing of the polymer film during the retort process and the DSC measured average melting point of PET in the polymer film is greater than 247.0° C.

In contrast to the compositions for the polymer film in the polymer and metal laminate structure of the container for food products that do comprise a blushing controlling component or blushing-retardant, the DSC measured melting point of PET in the polymer film having the same PET and PBT blend composition but without the blushing controlling component or blushing-retardant ranged below 242.5° C. and in some cases ranged below 240.5° C. In some other case, the DSC measured average melting of the polymer film using the same blend composition of PET and PBT composition but without the blushing controlling component or blushing-retardant ranged below 242.5° C. and in some cases ranged below 240.5° C.

The polymer films or polymeric layers comprising a blushing controlling component or blushing-retardant and a blend of PET and PBT are primarily laminated or thermally laminated or thermally fused onto the exterior surface or the external metal surface of the container for food and contain one or more layers of polymer film or polymeric layer.

The polymer films or polymeric layers comprising a blushing controlling component or blushing-retardant and a blend of PET and PBT also can be laminated or thermally laminated or thermally or fused onto the interior surface or the internal metal surface of the container for food contain one or more layers of polymer film or polymeric layer.

In one embodiment, the polymer film containing the blushing controlling component or blushing-retardant and a blend of PET and PBT may comprise one layer. In another embodiment, the polymer film containing the blushing controlling component or blushing-retardant and a blend of PET and PBT may comprise at least 2 layers. In another embodiment, the polymer film containing the blushing controlling component or blushing-retardant and a blend of PET and PBT may comprise multiple layers.

A multilayered film for the exterior surface or the external metal surface of the container for food may include a container-side or inside layer or bonding layer (for fusing, heat sealing or laminating to the metal), an external environment contacting or direct hot water or steam contacting outside layer or a skin layer. In addition, there may be one or more core layers between the layer between the inside layer or bonding layer and the skin layer. In one embodiment, only the core layer or the core layers of the multilayered film for the exterior surface or the external metal surface of the container contain the blushing controlling component or blushing-retardant. In another embodiment, at least one layer of the multilayered film for the exterior surface or the external metal surface of the container contain the blushing controlling component or blushing-retardant. In another embodiment, all the layers of the multilayered film for the exterior surface or the external metal surface of the container contain the blushing controlling component or blushing-retardant. In another embodiment, the core layer or the core layers of the multilayered film for the exterior surface or the external metal surface of the container contain the blushing controlling component or blushing-retardant. In another embodiment, at least the skin layer of the multilayered film for the exterior surface or the external metal surface of the container that is in direct contact with the external environment comprises the blushing controlling component or blushing-retardant.

In one embodiment, only one layer of the multilayered film for the exterior surface or the external metal surface of the container comprise the blushing controlling component or blushing-retardant and a blend of PET and PBT. In another embodiment, at least one layer of the multilayered film for the exterior surface or the external metal surface of comprise the blushing controlling component or blushing-retardant and a blend of PET and PBT. In another embodiment, the core layer or layers of the multilayered film for the exterior surface or the external metal surface of comprise the blushing controlling component or blushing-retardant and a blend of PET and PBT.

In another embodiment, all the layers of the multilayered film for the exterior surface or the external metal surface comprise the blushing controlling component or blushing-retardant and a blend of PET and PBT. In another embodiment, the core layer or the core layers of the multilayered film for the exterior surface or the external metal surface comprise the blushing controlling component or blushing-retardant and a blend of PET and PBT. In another embodiment, at least skin layer of the multilayered film for the exterior surface or the external metal surface comprise the blushing controlling component or blushing-retardant and a blend of PET and PBT.

A multilayered film for the interior surface or the internal metal surface of the container for food may include a container-side or inside layer or bonding layer (for fusing, heat sealing or laminating to the metal), a food-side or food contacting or outside layer and a food release layer. In addition, there may be one or more core layers between the layer bonded to the metal surface and the food side layer that is in direct contact with the food stored inside the container.

In one embodiment, only the core layer or the core layers the multilayered film for the interior surface or the internal metal surface of the container for food contain the blushing controlling component or blushing-retardant. In another embodiment at least one layer of the multilayered film for the interior surface or the internal metal surface of the container for food contain the blushing controlling component or blushing-retardant. In another embodiment, all the layer of the multilayered film for the interior surface or the internal metal surface of the container for food contain the blushing controlling component or blushing-retardant. In another embodiment, the core layer or the core layers of the multilayered film for the interior surface or the internal metal surface of the container for food contain the blushing controlling component or blushing-retardant.

In one embodiment, only one layer of the multilayered film for the interior surface or the internal metal surface comprises the blushing controlling component or blushing-retardant and a blend of PET and PBT. In another embodiment, at least one layer of the multilayered film for the interior surface or the internal metal surface of comprise the blushing controlling component or blushing-retardant and a blend of PET and PBT. In another embodiment, all the layer of the multilayered film for the interior surface or the internal metal surface comprise the blushing controlling component or blushing-retardant and a blend of PET and PBT.

The single layer or the multi-layered polymer films comprising a blushing controlling component or blushing-retardant and a blend of PET and PBT is a biaxially drawn film. The single layer or the multi-layered polymer films comprising a blushing controlling component or blushing-retardant and a blend of PET and PBT is a biaxially oriented film.

In one embodiment, an embodiment herein discloses a composition for the polymer in the polymer and metal laminate structure of the container for food products that comprises a blushing controlling component or blushing-retardant and a blend of PET and PBT to prevent blushing of the polymer film during the retort process also comprises a dye or a pigment for coloring the polymer. Preferably, the polymer film comprises a multi-layer film and at least one layer of the multi-layer film contains a dye or pigment.

An embodiment herein also discloses the process to prepare the composition for the polymer in the polymer and metal laminate structure of the container for food products that comprises a blushing controlling component and a blend of PET and PBT to prevent blushing of the polymer film during the retort process.

Process for Making Biaxially Oriented Film

Preferably the PET film suitable for use in this invention is biaxially oriented prior to laminating it to the metal substrate.

The single layer extruded film or multi-layer coextruded films are made using a sequential process consisting of extrusion of a film followed by biaxial orientation process. The single layer extruded film or multi-layer coextruded film is extruded after being heated, melted and pumped through one or more single or twin-screw extruders and the extruded film exits a die as a sheet of polymer which is quenched in air before being cast onto a chilled roll or drum, preferably using an electrostatic pinner. The cast sheet after solidification is heated and oriented or stretched in the machine direction (or MD) through a series of heated and different rotation speeds speed rolls, followed by heating in a tenter oven and transverse direction (or TD), i.e. perpendicular to the MD stretching or orientation of the film. The single layer film is extruded using a single or twin-screw extruder and the multilayer coextruded film is made by a single or twin-screw main extruder for melting and conveying the core blend to the die and by one or two sub-extruders for melting and conveying the other layer such as the skin layers to the die. In one embodiment, extrusion through the main extruder takes place at processing temperatures of about. 250° C. to 285° C. degree. C and extrusion through the sub-extruders takes place at processing temperatures of about. 250° C. to 280° C.

The polymer is melted to form a single layer film, as do both the main and the sub polymer melt streams to form a multi-layered film, flow through a die and is cast onto a cooling drum whose surface temperature is controlled at about 21° C. to solidify the non-oriented laminate. The non-oriented laminate sheet is stretched in the longitudinal direction at about 75° C. to 85° C. at a stretching ratio of about 2.5× to 4.5× times the original length and the resulting stretched sheet is optionally annealed at around 70° C. to obtain a uniaxially oriented film.

The uniaxially oriented film is introduced into a tenter and is heated to temperatures between 75 and 95° C. and stretched in the transverse direction about 3.5× to 5.0× times the original width and then heat-set or annealed at a temperature from about 180° C. to 220° C. to reduce internal stresses due to the orientation and minimize shrinkage and give a relatively thermally stable biaxially oriented sheet.

Process for Laminating the Film on to the Metal Sheet

A metal substrate, such as tin-free steel (TFS), with a thickness of 0.154 mm (0.0061") to 0.251 mm (0.0099") is preheated to about 190° C. (374° F.). The steel and film were passed through a set of nipped rolls forming the initial bond of film to steel. The film and steel laminate structure are then passed through a secondary heating operation at about 190° C. (374° F.) to 225° C. (437° F.) for about 5 to 10 seconds and then cooled to room temperature by way of a chilled roller or immersion in a water bath.

Test Methods

Thickness: Overall film thickness of a monolithic film was determined by measuring thickness of a stack of 10 sheets of the film by micrometer and dividing the measurement by 10. Measurements are repeated every 9 inches (22.9 cm) in the transverse direction of the film. Thickness of each coextruded layer of the multilayer film and total thickness were measured by adding alumina pigment particles to alternating film layers effective to differentiate adjacent layers of small cross-sectional pieces of film cut perpendicular to the plane of the film and examined by scanning electron microscope (SEM).

Surface Roughness: Surface roughness was measured with a Surfcorder SE-500 surface roughness measurement instrument (Kosaka Laboratory, Ltd., Japan). The measurements were repeated 3 times and the average value of Ra was recorded.

Intrinsic viscosity: IV was measured using a solution viscometer at 25° C. Sample solution was prepared by dissolving at 103° C. 100±1 mg polymer in 30 mL solution of a mixture of 40% 1,1,2,2-tetrachloroethane and 60% phenol. IV is calculated by the formula, $IV=[(t_{avg}/t_0-1)-2 \ln(t_{avg}/t_0)0.5/[(sample/20)*(100\%)]$, where $t_{avg}$ and $t_0$ are the average of four trial times in seconds to run dissolved polymer solution and solvent solution only through the viscometer, respectively.

Carboxyl End Group Concentration: Carboxyl end group concentration was determined by ASTM Standard method D7409-07.

Trans-esterification (% ester exchange): calculated by taking the difference between the melt temperature of pure PET (255° C.) and the PET melt peak of the finished film as measured by DSC, all divided by 2.1 (° C. per mol % substitution).

DSC Method: The sample is put in a pan and a lid was crimped on. The sample in the pan and an empty pan with crimped lid (control) are heated at a rate of 10° C./min from 40° C. to 280° C. (1st heat) and held there for 5 min, then cooled to 40° C. at a rate of 10° C./min and held at 40° C. for 5 minutes before being heated at a rate of 10° C./min to 280° C. ($2^{nd}$ heat).

Blush resistance: Laminated film-on-metal samples are stamped into metal container lids. Metal containers (food can bodies) that have approximate interior dimensions of 2.75 inches in diameter and 4 inches high are filled with tap water at approximately 25° C. The sample lids are attached to the containers using a seamer to form a finished food can. Finished cans are placed into an Allpax retort chamber lid-side-down so that the water inside the container is in contact with the lid. The retort sequence is 103 minutes in total, 4 minutes to ramp up the steam pressure to 15.3 psi (215° F.), 90 minutes at 251° F., followed by 9 minutes of cooling with city water (chamber flooding). Samples are removed from the chamber, allowed to cool to room temperature, and evaluated visually for blushing. Blushing results are evaluated by holding the can at arm's length with the sample lid perpendicular to the floor and approximately 12" below eye level as follows.

Excellent: Film is completely clear with no hazing or clouding as compared to a non-steamed control sample.
 a) Good: samples show slight, isolated areas of hazing or clouding as compared to a non-steamed control sample when viewed. Metal substrate is still clearly visible through the film on all parts of the sample.
 b) Fair: Up to 50% of the sample surface shows obvious clouding or hazing with the metal substrate still visible through the film.
 c) Poor: More than 50% of the entire surface of the sample has hazed over with sufficient opacity to partially obscure the metal surface.

Chemical resistance: Laminated film/metal sheets are cut into 2 inch×2 inch (5 cm×5 cm) samples. The samples are reverse impacted using a Gardco impact tester, Model #5512, (Paul N. Gardner Company, Inc., Pompano Beach, Fla.) with 2 lb (4.4 kg) weight and 0.500 inch (1.25 cm) diameter die at a height of 14 cm. Impacted samples are immersed in Walgreens Tub & Tile Cleaner at 100° F. (37.8° C.) and evaluated for delamination and color change after 30, 60, and 90 day soak periods.

EXAMPLES

Example 1 (Comparative Example)

This example describes the extrusion followed by biaxial stretching to form a biaxially oriented film using a blend in which the two major components are PET and PBT polymers. The input polymer blend is pre-mixed in the ratio of 55% by weight of PBT homopolymer 1200M from Toray Plastics and 45% by weight of PET which consists of 25% by weight of PET homopolymer F21MP from Toray Plastics, 5% by weight of PET homopolymer with 2% of 2.5 micron average size silica particles for friction control and handling from Toray Plastics, and 15% of a PET based pinning masterbatch F27M from Toray Plastics. The pre-mixed polymer blend is well mixed and dried in vacuum dryer at 300° F. for 6 hours. The dried pellets are transferred to a feed hopper, also under vacuum to maintain moisture content below 50 ppm, of tandem set of single screw extruders with a maximum barrel temperature of 270° C. and an estimated residence time of about 13 minutes. The molten polymer blend exits the dye and a die temperature of about 250° C. and is cast onto a water cooled drum whose surface temperature is about 20° C. in order to rapidly cool and solidify the film with minimal or no crystallization. The average thickness of the extruded film is 167 μm.

The extruded and cast film is biaxially oriented by first preheating the film to around 80° F. by way of heated rollers and then stretched 3.4× in the machine direction and quickly cooled to 20° C. The film is then reheated in a tentering oven to about 80° C. and subsequently stretched 4.0× in the transverse direction. The biaxially drawn film is then annealed at about 210° C. to the increase the crystallinity on lock in the polymer orientation. The average film thickness of the biaxially oriented film is 12 μm.

The intrinsic viscosity (IV) of the biaxially oriented film of Example 1 was 0.765. The DSC scan of the biaxially oriented film showed two distinct melting peaks for PET and PBT. The melting points (Tm) of the PET were measured at three points along the transverse direction of the web and they were 241.4° C., 242.0° C. and 240.8° C. for operator side, center, and drive side respectively. The corresponding degree of transesterification at the locations of the Tm measurements was calculated to be 6.47 mol %, 6.17 mol % and 6.78 mol % respectively for an overall average of 6.47 mol %.

Example 2

This example describes the extrusion followed by biaxial stretching to form a biaxially oriented film using a blend in which the two major components are PET and PBT polymers. The input polymer blend is pre-mixed in the ratio of 55% by weight of PBT homopolymer 1200M from Toray Plastics and 45% by weight of PET which consists of 24% by weight of PET homopolymer F21MP from Toray Plastics, 5% by weight of PET homopolymer with 2% of 2.5 micron average size silica particles for friction control and handling from Toray Plastics, and 15% of a PET based pinning masterbatch F27M from Toray Plastics, and 1% of a PET homopolymer PQB7-76 Prime melt blended with 10% of a blushing-retardant or blushing controlling component, Ultranox 626 from Addivant, so that the blushing-retardant or blushing controlling component is 0.1% by weight of the total blend composition of the film. The pre-mixed polymer blend is well mixed and dried in vacuum dryer at 300° F. for 6 hours. The dried pellets are transferred to a feed hopper, also under vacuum to maintain moisture content below 50 ppm, of tandem set of single screw extruders with a maximum barrel temperature of 270° C. and an estimated residence time of about 13 minutes. The molten polymer blend exits the dye and a die temperature of about 250° C. and is cast onto a water cooled drum whose surface temperature is about 20° C. in order to rapidly cool and solidify the film with minimal or no crystallization. The average thickness of the extruded film is 167 μm.

The extruded and cast film is biaxially oriented by first preheating the film to around 80° F. by way of heated rollers and then stretched 3.4× in the machine direction and quickly cooled to 20° C. The film is then reheated in a tentering oven to about 80° C. and subsequently stretched 4.0× in the transverse direction. The biaxially drawn film is then annealed at about 210° C. to the increase the crystallinity on lock in the polymer orientation. The average film thickness of the biaxially oriented film is 12 μm.

The IV of the biaxially oriented film containing blushing-retardant or blushing controlling component of Example 2 was 0.772. The DSC scan of the biaxially oriented film containing blushing-retardant or blushing controlling component of Example 2 showed two distinct melting peaks for PET and PBT. The melting points (Tm) of the PET were measured at three points along the transverse direction of the web and they and were 244.8° C., 245.2° C., AND 245.5° C. for operator side, center, and drive side respectively. The corresponding degree of transesterification at the locations of the Tm measurements was calculated to be 4.88 mol %, 4.66 mol %, and 4.50 mol %, respectively for an overall average of 4.68 mol %. The melting point (Tm) of the PET increased by an average of 3.8° C. and the degree of transesterification between the PET and PBT decreased across the web by an average of 1.79 mol % for the biaxially oriented film containing blushing-retardant or blushing controlling component compared to the biaxially oriented film not containing blushing-retardant or blushing controlling component.

Comparative Example 3

This example describes the extrusion followed by biaxial stretching to form a biaxially oriented film using a blend in which the two major components are PET and PBT polymers. The input polymer blend is pre-mixed in the ratio of 55% by weight of PBT homopolymer 1200M from Toray Plastics and 45% by weight of PET which consists of 25% by weight of PET homopolymer F21MP from Toray Plastics, 5% by weight of PET homopolymer with 2% of 2.5 micron average size silica particles for friction control and handling from Toray Plastics, and 15% of a PET based pinning masterbatch F27M from Toray Plastics. The pre-mixed polymer blend is well mixed and dried at 250° F. for 12 hours. The dried pellets are transferred to a feed hopper of a single screw extruder with a maximum barrel temperature of 277° C. and an estimated residence time of less than 4 minutes. The molten polymer blend exits the dye and a die temperature of about 250° C. and is cast onto a water cooled drum whose surface temperature is about 20° C. in order to rapidly cool and solidify the film with minimal or no crystallization. The average thickness of the extruded film is 165 μm.

The extruded and cast film is biaxially oriented by first preheating the film to around 71° C. by way of heated rollers and then stretched 2.8× in the machine direction and cooled to 32° C. The film is then reheated in a tentering oven to about 74° C. and subsequently stretched 4.0× in the transverse direction. The biaxially drawn film is then annealed at about 193° C. to the increase the crystallinity on lock in the polymer orientation. The average film thickness of the biaxially oriented film is 12 μm.

The intrinsic viscosity (IV) of the biaxially oriented film was 0.826. The DSC scan of the biaxially oriented film showed two distinct melting peaks for PET and PBT. The melting point (Tm) of the PET was 252.3° C. and the melting point (Tm) of the PBT was 220.4° C. The corresponding degree of transesterification was calculated to be 1.28%.

Example 4

This example describes the extrusion followed by biaxial stretching to form a biaxially oriented film using a blend in which the two major components are PET and PBT polymers. The input polymer blend is pre-mixed in the ratio of 55% by weight of PBT homopolymer 1200M from Toray Plastics and 45% by weight of PET which consists of 24% by weight of PET homopolymer F21MP from Toray Plastics, 5% by weight of PET homopolymer with 2% of 2.5 micron average size silica particles for friction control and handling from Toray Plastics, and 15% of a PET based pinning masterbatch F27M from Toray Plastics, and 1% of a PET homopolymer PQB7-76 Prime melt blended with 10% of a blushing-retardant or blushing controlling component, Ultranox 626 from Addivant, so that the blushing-retardant or blushing controlling component is 0.1% by weight of the total blend composition of the film. The pre-mixed polymer blend is well mixed and dried at 250° F.

for 12 hours. The dried pellets are transferred to a feed hopper of a single screw extruder with a maximum barrel temperature of 277° C. and an estimated residence time of less than 4 minutes. The molten polymer blend exits the dye and a die temperature of about 250° C. and is cast onto a water cooled drum whose surface temperature is about 20° C. in order to rapidly cool and solidify the film with minimal or no crystallization. The average thickness of the extruded film is 165 µm.

The extruded and cast film is biaxially oriented by first preheating the film to around 71° C. by way of heated rollers and then stretched 2.8× in the machine direction and cooled to 32° C. The film is then reheated in a tentering oven to about 74° C. and subsequently stretched 4.0× in the transverse direction. The biaxially drawn film is then annealed at about 193° C. to the increase the crystallinity on lock in the polymer orientation. The average film thickness of the biaxially oriented film is 12 µm.

The intrinsic viscosity (IV) of the biaxially oriented film was 0.854. The DSC scan of the biaxially oriented film showed two distinct melting peaks for PET and PBT. The melting point (Tm) of the PET was 253.1° C. and the melting point (Tm) of the PBT was 221.1° C. The corresponding degree of transesterification was calculated to be 0.92%.

Example 5

This example describes the extrusion followed by biaxial stretching to form a biaxially oriented film using a blend in which the two major components are PET and PBT polymers. The input polymer blend is pre-mixed in the ratio of 55% by weight of PBT homopolymer 1200M from Toray Plastics and 45% by weight of PET which consists of 23% by weight of PET homopolymer F21MP from Toray Plastics, 5% by weight of PET homopolymer with 2% of 2.5 micron average size silica particles for friction control and handling from Toray Plastics, and 15% of a PET based pinning masterbatch F27M from Toray Plastics, and 2% of a PET homopolymer PQB7-76 Prime melt blended with 10% of a blushing-retardant or blushing controlling component, Ultranox 626 from Addivant, so that the blushing-retardant or blushing controlling component is 0.2% by weight of the total blend composition of the film. The pre-mixed polymer blend is well mixed and dried at 250° F. for 12 hours. The dried pellets are transferred to a feed hopper of a single screw extruder with a maximum barrel temperature of 277° C. and an estimated residence time of less than 4 minutes. The molten polymer blend exits the dye and a die temperature of about 250° C. and is cast onto a water cooled drum whose surface temperature is about 20° C. in order to rapidly cool and solidify the film with minimal or no crystallization. The average thickness of the extruded film is 165 µm.

The extruded and cast film is biaxially oriented by first preheating the film to around 71° C. by way of heated rollers and then stretched 2.8× in the machine direction and cooled to 32° C. The film is then reheated in a tentering oven to about 74° C. and subsequently stretched 4.0× in the transverse direction. The biaxially drawn film is then annealed at about 193° C. to the increase the crystallinity on lock in the polymer orientation. The average film thickness of the biaxially oriented film is 12 µm.

The intrinsic viscosity (IV) of the biaxially oriented film was 0.851. The DSC scan of the biaxially oriented film showed two distinct melting peaks for PET and PBT. The melting point (Tm) of the PET was 253.5° C. and the melting point (Tm) of the PBT was 221.1° C. The corresponding degree of transesterification was calculated to be 0.70%.

Example 6

This example describes the extrusion followed by biaxial stretching to form a biaxially oriented film using a blend in which the two major components are PET and PBT polymers. The input polymer blend is pre-mixed in the ratio of 55% by weight of PBT homopolymer 1200M from Toray Plastics and 45% by weight of PET which consists of 20% by weight of PET homopolymer F21MP from Toray Plastics, 5% by weight of PET homopolymer with 2% of 2.5 micron average size silica particles for friction control and handling from Toray Plastics, and 15% of a PET based pinning masterbatch F27M from Toray Plastics, and 5% of a PET homopolymer PQB7-76 Prime melt blended with 10% of a blushing-retardant or blushing controlling component, Ultranox 626 from Addivant, so that the blushing-retardant or blushing controlling component is 0.5% by weight of the total blend composition of the film. The pre-mixed polymer blend is well mixed and dried at 250° F. for 12 hours. The dried pellets are transferred to a feed hopper of a single screw extruder with a maximum barrel temperature of 277° C. and an estimated residence time of less than 4 minutes. The molten polymer blend exits the dye and a die temperature of about 250° C. and is cast onto a water cooled drum whose surface temperature is about 20° C. in order to rapidly cool and solidify the film with minimal or no crystallization. The average thickness of the extruded film is 165 µm.

The extruded and cast film is biaxially oriented by first preheating the film to around 71° C. by way of heated rollers and then stretched 2.8× in the machine direction and cooled to 32° C. The film is then reheated in a tentering oven to about 74° C. and subsequently stretched 4.0× in the transverse direction. The biaxially drawn film is then annealed at about 193° C. to the increase the crystallinity on lock in the polymer orientation. The average film thickness of the biaxially oriented film is 12 µm.

The intrinsic viscosity (IV) of the biaxially oriented film was 0.794. The DSC scan of the biaxially oriented film showed two distinct melting peaks for PET and PBT. The melting point (Tm) of the PET was 254.4° C. and the melting point (Tm) of the PBT was 220.3° C. The corresponding degree of transesterification was calculated to be 0.30%.

Example 7 (Comparative Example)

The biaxially oriented film of Example 1 was thermally laminated onto surface of a 0.21 mm tin free steel sheet by preheating the metal surface to about 195° C. and bringing the film into contact with the metal surface by passing the film and metal through a pair of nipped rollers. Subsequently the entire laminated structure is reheated to 190° C. for about 5 seconds by passing through secondary heating process, then rapidly cooled by immersion in a water bath at about 20° C.

The biaxially oriented film-steel laminate was tested for its Blush Resistance according to the method described under Test Methods. The Blush Resistance of the biaxially oriented film-steel laminate was Fair, meaning that the film underwent non-uniform change in crystallinity and refractive index creating a hazy appearance.

Example 8

The biaxially oriented film of Example 2 containing blushing-retardant or blushing controlling component was thermally laminated onto surface of a 0.21 mm tin free steel sheet by preheating the metal surface to about 195° C. and bringing the film into contact with the metal surface by passing the film and metal through a pair of nipped rollers. Subsequently the entire laminated structure is reheated to 190° C. for about 5 seconds by passing through secondary heating process, then rapidly cooled by immersion in a water bath at about 20° C.

The biaxially oriented blushing-retardant or blushing controlling component containing film-steel laminate was tested for its Blush Resistance according to the method described under Test Methods. The Blush Resistance of biaxially oriented blushing-retardant or blushing controlling component containing film-steel laminate from Example 2 was Excellent. The Blush Resistance of the biaxially oriented film containing blushing-retardant or blushing controlling component is significantly higher or better compared to the biaxially oriented film not containing blushing-retardant or blushing controlling component.

What is claimed is:

1. A polymer film comprising an anti-blushing composition in a blend comprising polyethylene terephthalate (PET) and polybutylene terephthalate (PBT), wherein PBT is polymerized in presence of tetra-n-butyl titanate, tetraisopropyl titanate or combinations thereof;
  wherein the blend has an intrinsic viscosity greater than 0.765 and contains at least 50 wt. % of PBT;
  wherein a melting point of the PET is greater than 244.5° C. and lower than 254.4° C.;
  wherein a degree of transesterification between the PET and the PBT is greater than 0.3 mol % and less than 6.47 mol %;
  wherein the anti-blushing composition excludes:
  triphenyl phosphite,
  bis(acetodeca)pentaerythritol diphosphite,
  bis(2,6-di-t-butyl-4-methylphenyl)pentaerythritol dibenzophosphite,
  bis(2,6-di-t-butyl-4-methylphenyl)pentaerythritol diphosphite,
  bis(2,4-dicumylphenyl)pentaerythritol diphosphite,
  2-[[2,4,8,10-tetrakis(1,1-dimethylether)dibenzo[d,f][1,3,2]dioxaphosphepin-6-yl]oxy]-N,N-bis[2-[2,4,8,10-tetrakis(1,1-dimethylether)dibenzo[d,f][1,3,2]dioxaphosphepin-6-yl)oxy]ethyl]ethanolamine,
  diphenyl isodecylphosphite,
  benzyl ethylphosphonate,
  trimethyl phosphate,
  triethyl phosphate,
  tributyl phosphate,
  ethyl diethylphosphonoacetate,
  tri-2-ethylhexyl phosphate,
  tris(2-chloroethyl)phosphate, and
  bis(acetodeca)pentaerythritol diphosphite; and
  wherein the anti-blushing composition comprises dialkyl pentaerythritol di phosphonate, pentaerythritol phosphonate or combinations thereof;
  wherein the anti-blushing composition is configured to prevent blushing in the polymer film laminated directly to a metal sheet and exposed to steam at a temperature of 251° F. for 90 minutes, wherein the anti-blushing composition is about 0.01 wt. % to about 1 wt. % in the blend.

2. The polymer film of claim 1, wherein the anti-blushing composition comprises a phosphorus containing compound in an amount equal to or greater than about 0.1 weight percent of a total weight of the polymer film.

3. The polymer film of claim 2, wherein the phosphorus containing compound comprises pentacovalent phosphonate.

4. A metal laminated sheet comprising the polymer film of claim 3 and a metal sheet.

5. A metal laminated sheet comprising the polymer film of claim 2 and a metal sheet.

6. The polymer film of claim 1, wherein the anti-blushing composition further comprises phosphite, phosphepin, phosphonoacetate, phosphate, or combinations thereof.

7. A metal laminated sheet comprising the polymer film of claim 6 and a metal sheet.

8. The polymer film of claim 1, wherein the anti-blushing composition excludes benzyl ethylphosphonate.

9. A metal laminated sheet comprising the polymer film of claim 8 and a metal sheet.

10. The polymer film of claim 1,
  wherein the blend has an intrinsic viscosity is 0.772 or greater;
  wherein a melting point of the PET is 245° C. or greater; and
  wherein a degree of transesterification between the PET and the PBT is 4.68 mol % or less.

11. A metal laminated sheet comprising the polymer film of claim 10 and a metal sheet.

12. The polymer film of claim 1,
  wherein the blend has an intrinsic viscosity is 0.854 or greater;
  wherein a melting point of the PET is 253° C. or greater; and
  wherein a degree of transesterification between the PET and the PBT is 0.92 mol % or less.

13. The polymer film of claim 1, wherein the polymer film comprises a multi-layer film and at least one layer of the multi-layer film contains a dye or pigment.

14. A metal laminated sheet comprising the polymer film of claim 13 and a metal sheet.

15. A metal laminated sheet comprising the polymer film of claim 1 and a metal sheet.

16. The metal laminated sheet of claim 15, wherein the metal sheet comprises an electrolytic chromium coated steel sheet, an electro tin plated steel sheet, an aluminum sheet or combinations thereof.

17. A metal can or a lid of a metal can comprising the metal laminated sheet of claim 15.

* * * * *